(12) United States Patent
Takeyama et al.

(10) Patent No.: US 7,499,066 B2
(45) Date of Patent: Mar. 3, 2009

(54) IMAGE FORMING APPARATUS WITH IMPROVED CAPABILITY OF IMAGE SUPERPOSITION

(75) Inventors: Yoshinobu Takeyama, Kawasaki (JP); Nobuyuki Yanagawa, Chigasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1083 days.

(21) Appl. No.: 10/803,940

(22) Filed: Mar. 19, 2004

(65) Prior Publication Data

US 2004/0239745 A1 Dec. 2, 2004

(30) Foreign Application Priority Data

Mar. 20, 2003 (JP) ............................. 2003-078943

(51) Int. Cl.
*B41J 2/41* (2006.01)
*B41J 2/385* (2006.01)
*G03G 15/01* (2006.01)

(52) U.S. Cl. ...................... 347/116; 347/112; 347/115; 399/223; 399/299; 399/301; 399/302

(58) Field of Classification Search ....................... None
See application file for complete search history.

(56) References Cited

U.S. PATENT DOCUMENTS 6,075,547 A * 6/2000 Takeuchi .................... 347/116
6,222,566 B1 * 4/2001 Takeyama et al. ........... 347/116
6,263,178 B1 * 7/2001 Takeyama et al. ........... 399/228
2002/0037178 A1 * 3/2002 Saitoh et al. ................. 399/110
2004/0239745 A1 12/2004 Takeyama, et al.

FOREIGN PATENT DOCUMENTS

| JP | 9-68836 | 3/1997 |
|---|---|---|
| JP | 10-202944 | 8/1998 |
| JP | 11-20239 | 1/1999 |
| JP | 2002-094747 | 3/2002 |

OTHER PUBLICATIONS

U.S. Appl. No. 11/357,032, filed Feb. 21, 2006, Suzuki, et al.
U.S. Appl. No. 11/168,452, filed Jun. 29, 2005, Suzuki et al.

* cited by examiner

*Primary Examiner*—Luu Matthew
*Assistant Examiner*—Kendrick X Liu
(74) *Attorney, Agent, or Firm*—Oblon, Spivak, McClelland, Maier & Neustadt, P.C.

(57) ABSTRACT

An image forming apparatus including a light scanning device configured: to store in advance a predetermined base correction time; initiate optical image writing for a first round of rotation of an endless intermediate transfer member onto a latent image bearing member included in a first visible image forming unit based on a standard angle detection signal detected after a time Te determined as a time elapsed by a base correction time t1 from a time Ta; to correct a phase, during a period between a time Tc and a time including a time Tc and the base correction time t1, based on a time lag dt2 and a time lag dt1; and to initiate optical image writing for a second round of rotation of the endless intermediate transfer member onto the latent image bearing member included in the first visible image forming unit.

34 Claims, 10 Drawing Sheets

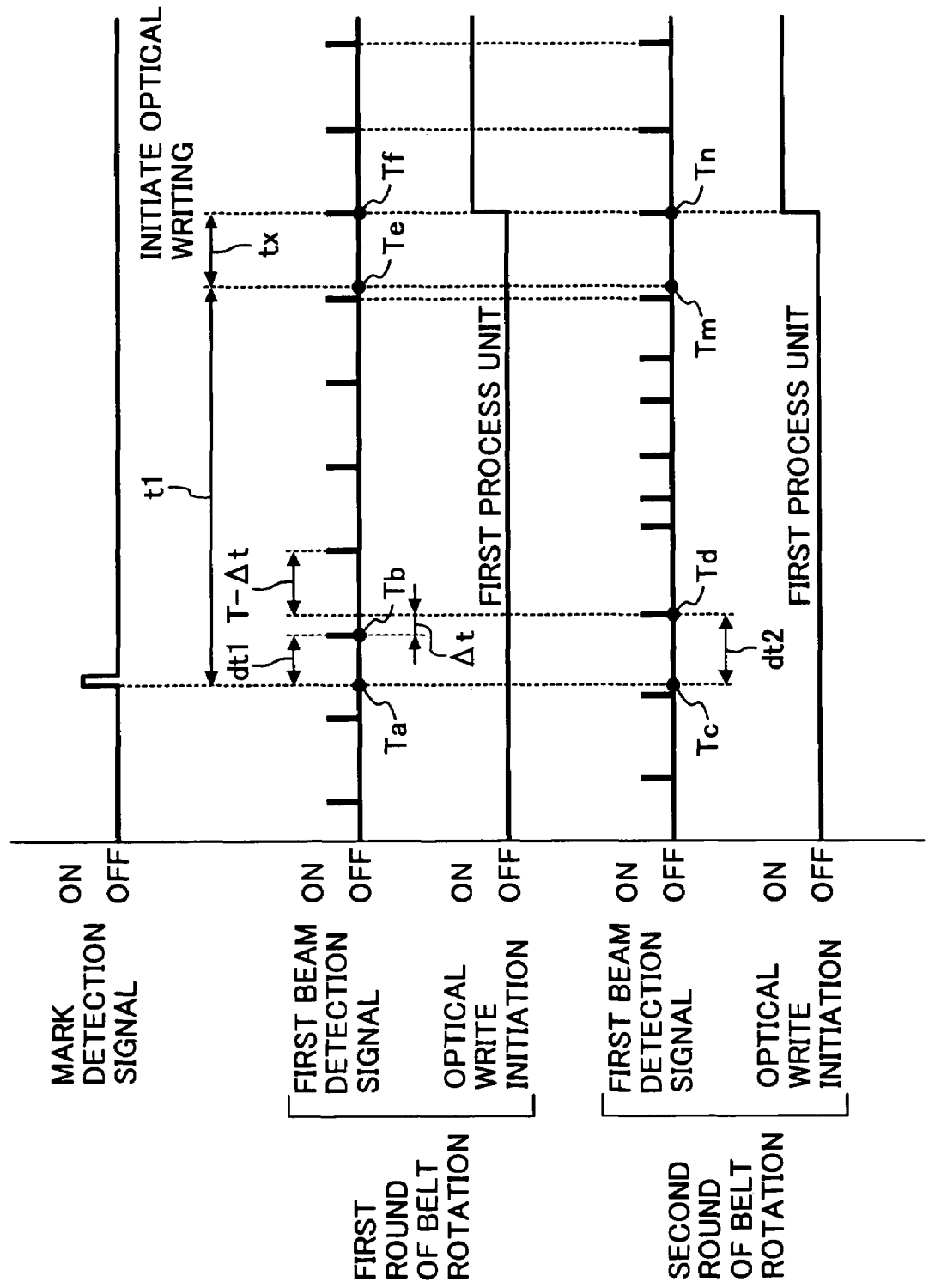

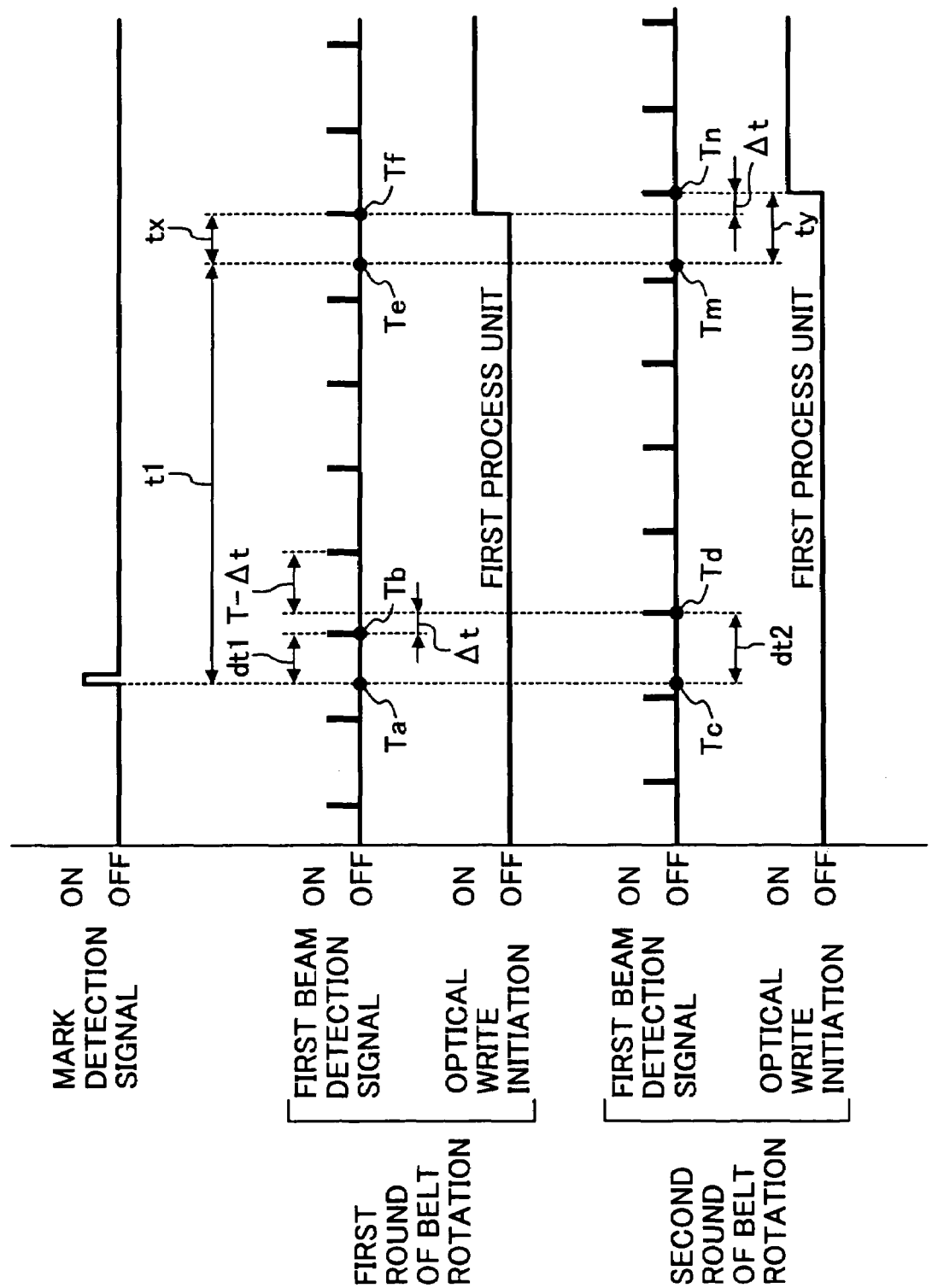

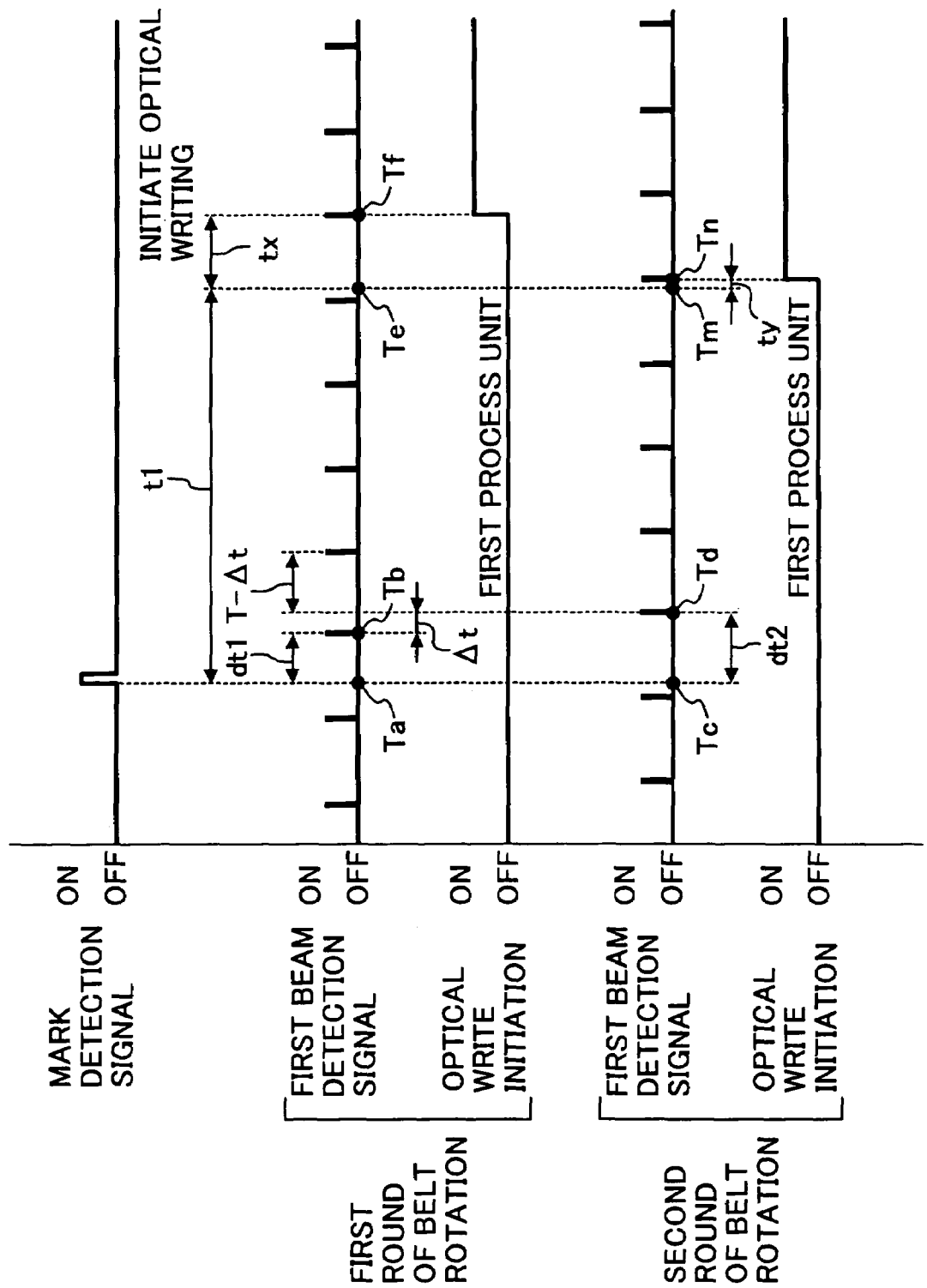

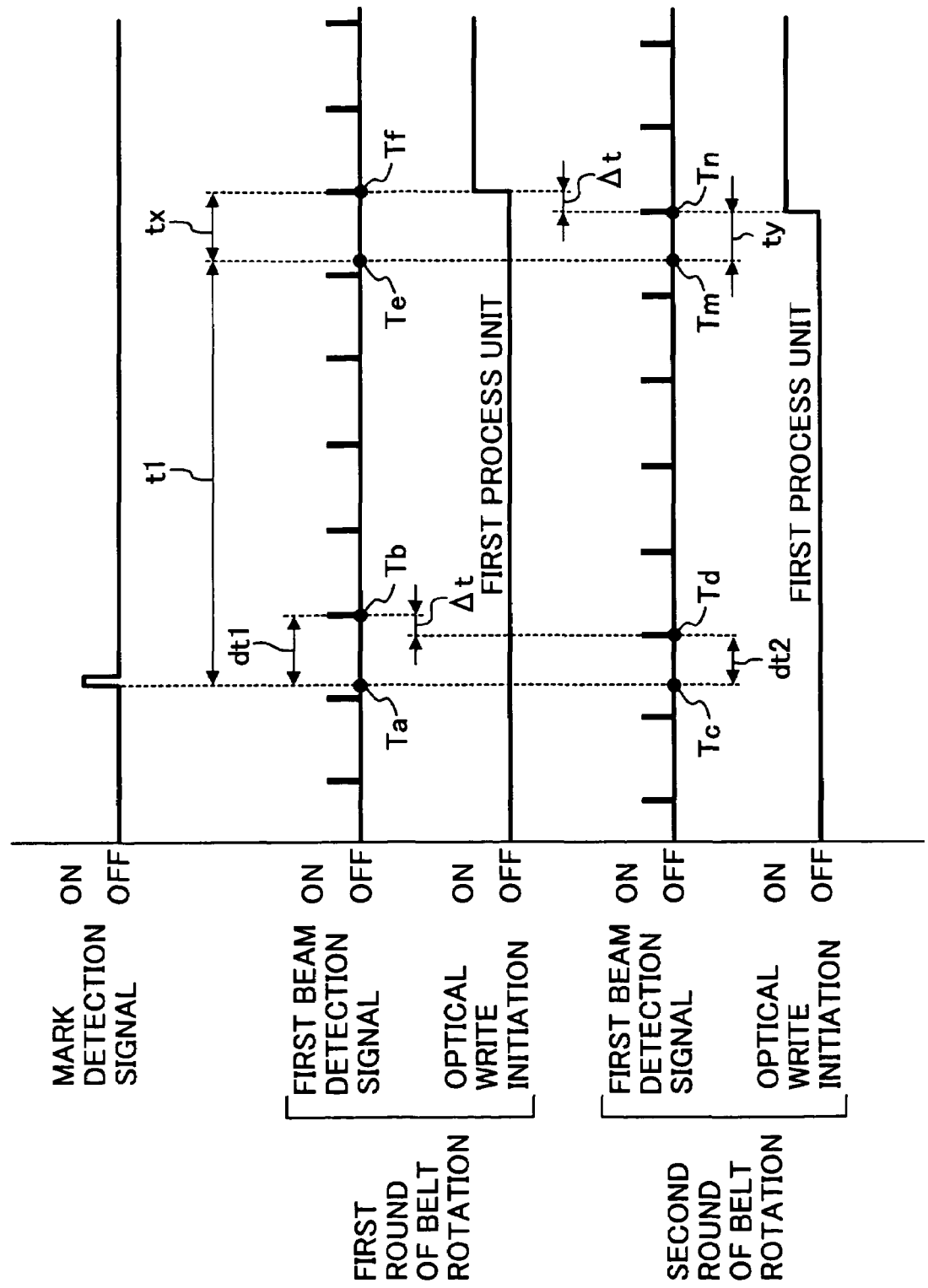

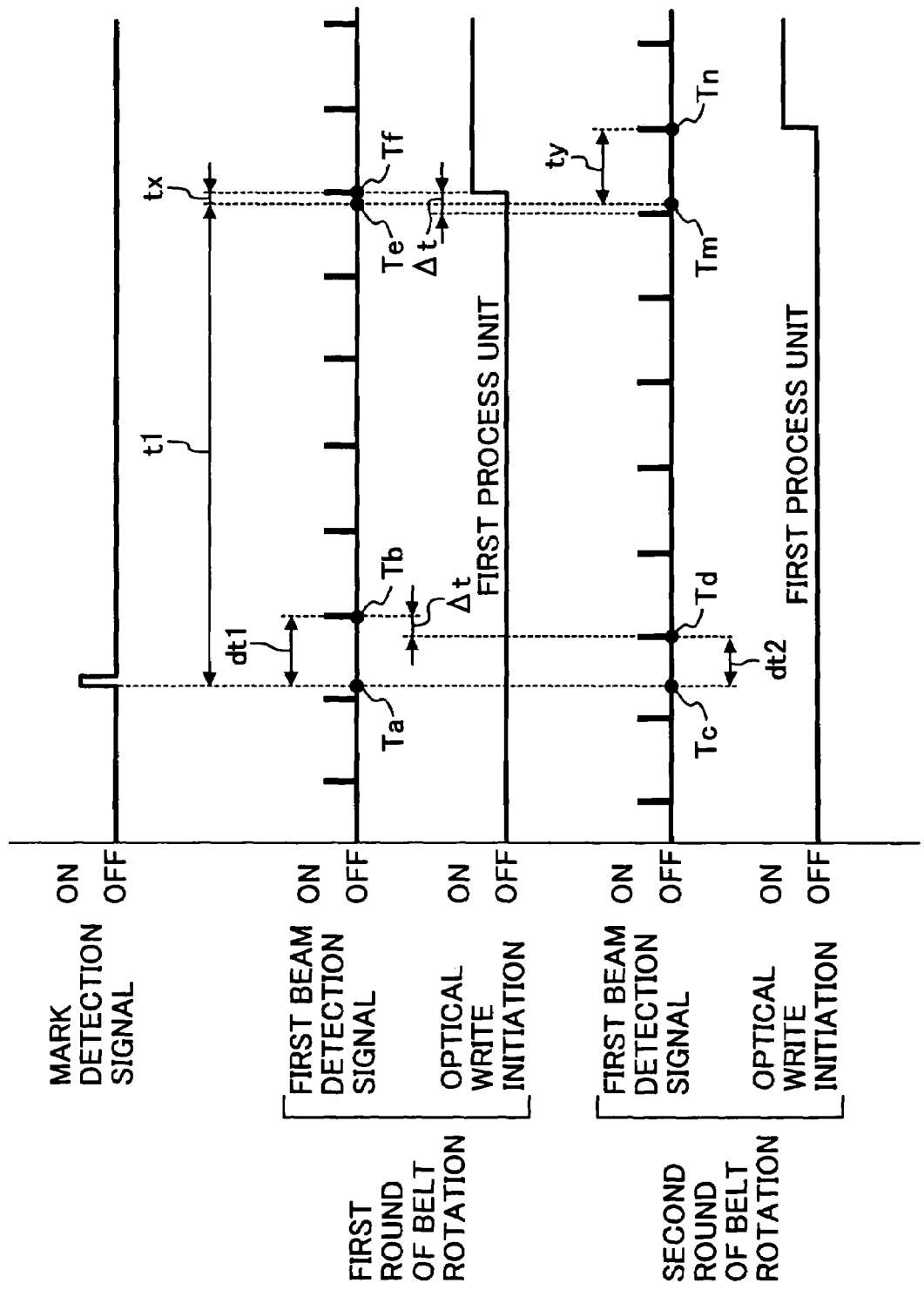

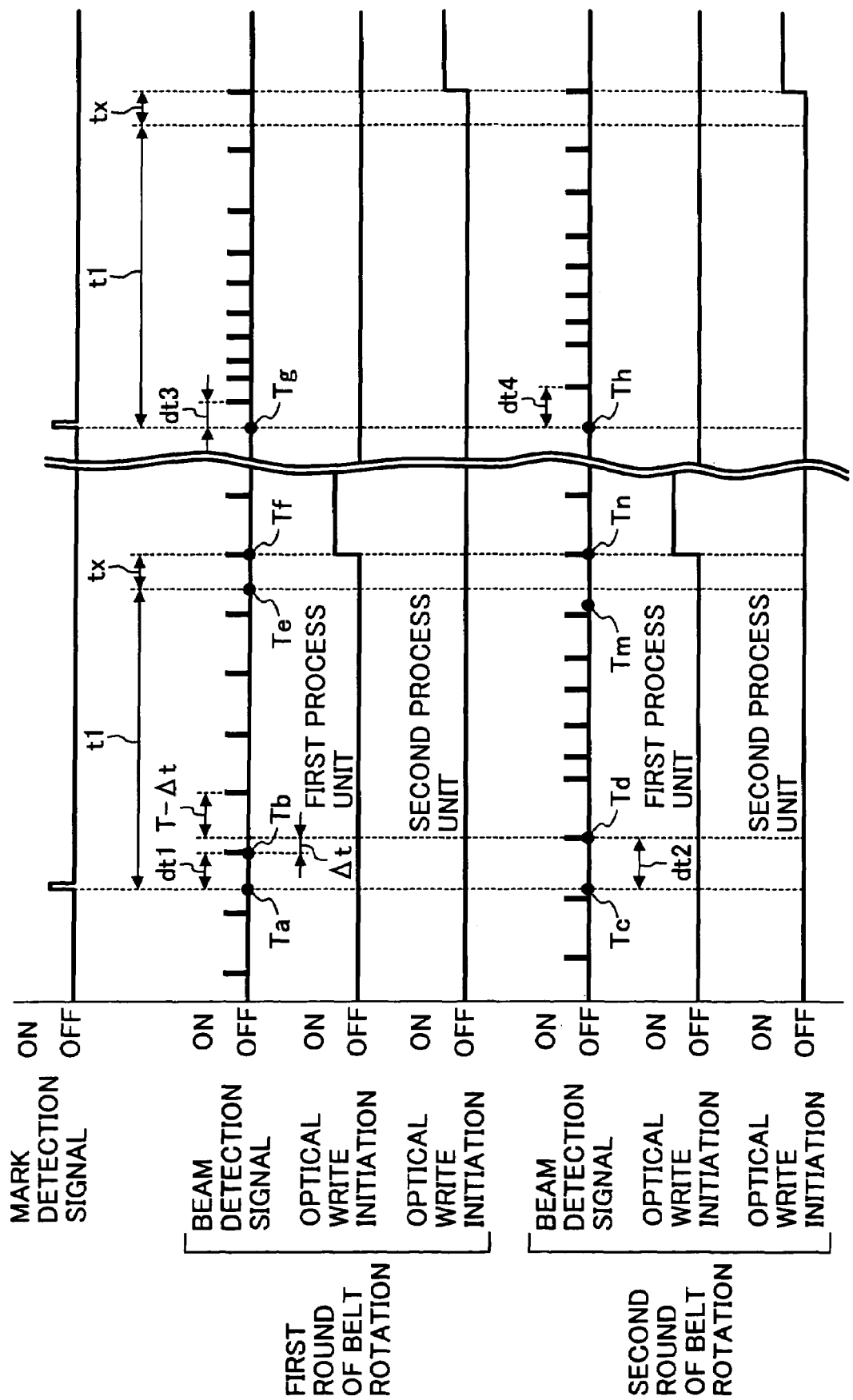

IMAGE FORMING APPARATUS WITH IMPROVED CAPABILITY OF IMAGE SUPERPOSITION

BACKGROUND

1. Field

This patent specification relates generally to image forming apparatuses, and more specifically to the apparatus provided with a plurality of visible image forming units each including development means for developing to visualize latent images held on latent image bearing members, and a light scanning means for forming the latent images through light beam scanning to be held onto the latent image bearing members of the visible image forming units.

2. Discussion of the Background

A number of apparatuses are known capable of forming images by creating images to be rendered visible on a latent image bearing member such as photoreceptor and by transferring onto an intermediate transfer member to be superimposed as a resultant images. Such apparatus may be exemplified by including only one visible image forming means comprising the latent image bearing member and plural developing units associated therewith.

In order to form proper superposed images by such an image forming apparatus, in general, the surface of intermediate transfer member has to be rotated repeatedly as many times as the number of image superposition.

As an example, in order to form a full-color image by superposing four visible images in the colors of yellow, magenta, cyan, and black (hereinafter referred to as Y, M, C, and K, respectively), Y image is first obtained by developing a latent image held on a developing means in use for Y color, and subsequently transferred onto the intermediate transfer member during a first round of its rotation.

Thereafter, M, C, and K images created on respective latent image bearing members are transferred sequentially onto intermediate transfer member during second, third, and fourth rounds of the rotation respectively, and a full-color image is finally obtained.

The latent image bearing member serves to hold a latent image generated by light beam scanning. The light beam scanning, in turn, is divided broadly into two, one in the direction of surface displacement of the latent image bearing member (i.e., vertical scanning direction) and the other the direction perpendicular thereto (main scanning direction).

The scanning in the main scanning direction is carried out with light beams repeatedly deflected to be scanned with an extremely short period along that direction by deflecting means including a rotating polygonal mirror and so on.

It is noted whether or no a light beam is located at a write initiation point is determined based on a beam detection signal which is output by a beam detection means provided to detect the beam at a predetermined location in the main scanning direction.

The timing for initiating light scanning, however, has to be determined after considering the location not only in the main scanning direction but also in the vertical scanning direction.

Therefore, the write initiation point in the vertical scanning direction is suitably determined by utilizing a mark detection signal output by a mark beam detection means for detecting a base mark which is affixed at a predetermined location in the direction of surface displacement of the intermediate transfer member.

To be more specific, the timing for initiating light scanning with respect to both the main and vertical scanning directions is adjusted by initiating the scanning based on the beam detection signal detected immediately after the generation of the mark beam detection signal.

In the light beam scanning carried out repeatedly along each rotation of the intermediate transfer member, however, shift in proper timing (or phase) of the scanning in the main scanning direction cannot sufficiently be avoided in general.

For example, assumed herein are a circumferential length of 600 mm and a linear speed of 40 mm/sec for the intermediate transfer member, and a scanning speed of 1000 time/sec in the main scanning direction for the light scanning means (which gives rise to 15000 for the number of beam scanning during one round of the transfer member rotation).

Also assumed that the light beam happens to be located at a write initiation point at the moment when a mark is detected. In this case, light beam scanning for the first round of rotation can be initiated at the noted moment of the mark detection.

In addition, the scanning continues in principle such that the light beam is located again at the write initiation point after the first round of rotation and that light beam scanning during the second round of the rotation (i.e., the fifteen thousand and first round of the main direction beam scanning) is then initiated.

In practice, however, this is not the case since the location of light beam in the main scanning direction is shifted away from the write initiation point when the first round of transfer member rotation is completed, because of an error in the circumferential length, and change in linear speed of intermediate transfer member. As a result, the difficulties arise as evidenced by the shift in phase of the scanning in the main scanning direction, as described earlier.

This shift brings about a change in the period between the mark detection and the initiation of light scanning based on the succeeding beam detection, thereby resulting in shear in superposed visible images (color shift in multiple-color images) in the vertical scanning direction.

In addition, a minute slippage may arise in a belt on driving roller in the case where a belt is used as an intermediate transfer means. In this case, the shift may arise with more ease in phase of the scanning in the main scanning direction each round of rotation compared with an intermediate transfer drum with less possibility of slippage.

Furthermore, although the case has been described above in which the scanning is carried out such that the light beam is located again at the write initiation point after the first round of rotation (or the number of repeated beam scanning is integer), other cases may also arise with a non-integer.

For example, if the abovementioned linear speed of the intermediate transfer member is altered to 42 mm/sec from the previous value of 40 mm/sec, the number of repeated beam scanning during one round of rotation is obtained as 14285.7. In this case, therefore, the shift in phase of light beam scanning in the main scanning direction is bought about regardless of the noted error in the circumferential length or a change in linear speed of intermediate transfer member.

As an image forming apparatus capable of alleviating the shear in superposed visible images caused by the noted shift in phase during the main direction scanning, an apparatus has been disclosed in Japanese Laid-Open Patent Application No. 10-202944.

This apparatus is adapted to control a polygon motor as the driving power source for a rotating polygonal mirror so as to adjust the phase of the rotation of polygonal mirror as a part of deflecting means to coincide with the signal output itop based on the difference in time between the signal itop and a signal BD. The signals itop and BD designate herein the mark detection, and the beam detection signals, respectively, as noted earlier.

By initiating light scanning for each round of the rotation of intermediate transfer drum with the apparatus, the shift in the phase of beam scanning can be resolved to a certain extent and the shear in superposed visible images due to the noted shift in phase during the main direction scanning can be suppressed effectively.

In order to form superposed images by such apparatuses, however, the surface of intermediate transfer member has to be rotated as many times as the number of image superposition, that is three times of the rotation for a triple-color image, for example. This comes to result a prolonged period of time of image formation coppered with the case of mono-color images which is carried out without image superposition.

On the other hand, another type of image forming apparatus for obtaining superposed images is also known previously, which is provided with as many visible image forming means as the number of the superposition each including a latent image bearing member and a developing means accompanied thereto.

For forming full-color images, for example, the noted apparatus is provided with four visible image forming means each in use for forming images of four colors Y, M, C, and K, respectively.

In this structure of the image forming apparatus, the superposition repeated as many times as required can be carried out during one or less round of the rotation of intermediate transfer means instead of rotating as many times as described earlier, and the aforementioned difficulty such as prolonged image forming period can be obviated, which is otherwise caused from rotating as many times as the number of image superposition.

This apparatus, however, may suffer from the shear in superposed visible images in the vertical scanning direction, when any phase shift is once caused among the plural visible image forming means in the main scanning direction.

As an image forming apparatus capable of alleviating such shear in superposed visible images in the vertical scanning direction, an apparatus has been disclosed in Japanese Laid-Open Patent Application No. 2000-94747.

This apparatus is adapted to perform light beam scanning using polygonal mirrors for exclusive use onto respective latent image bearing members of visible image forming means. In addition, each of the polygonal mirrors is provided with plural beam detection means corresponding thereto. Based on beam detection signals from the beam detection means, phase of the rotation of polygonal mirrors is controlled so as to synchronize the phase for respective mirrors.

By bringing through such synchronization the phase shift to coincide with each other among the plural visible image forming means in the main scanning direction, the shear of superposed images can be alleviated in the vertical scanning direction.

In such image forming apparatuses, however, a drawback arises in which the structure of light beam scanning means becomes unduly complicated by incorporating rotating polygonal mirrors, polygon motor, and motor control circuit and so on, for exclusive use for each visible image forming means.

SUMMARY

Accordingly, it is an object of the present disclosure to provide an image forming apparatus, having most, if not all, of the advantages and features of similar employed methods and systems, while eliminating many of the aforementioned disadvantages.

It is another object of the invention to provide an image forming apparatus capable of obviating several difficulties such as the shear of superposed images in the vertical scanning direction, prolonged image forming periods resulted from rotating an intermediate transfer member as many times as the number of image superposition, and undue complication in the structure of light beam scanning means caused by incorporating plural light deflecting means for exclusive use for each visible image forming units.

The following description is a synopsis of only selected features and attributes of the present disclosure. A more complete description thereof is found below in the section entitled "Description of the Preferred Embodiments"

To achieve the foregoing and other objects, an image forming apparatus is provided including a plurality of latent image bearing members;

a plurality of visible image forming units each including development means for developing latent images on the latent image bearing member to form visible images thereon;

a light scanning means for forming the latent images on the latent image bearing members, the scanning means including a deflecting means, to form latent images on surfaces of the latent image bearing members;

an endless intermediate transfer member;

means for rotating the endless intermediate transfer member;

a transfer means for transferring visible images formed by visible image forming units in a manner to be superposed on the endless intermediate transfer member;

a mark detection means for detecting a base mark affixed onto a predetermined location on the surface of the endless intermediate transfer member to provide a mark detecting signal corresponding thereto;

a standard angle detection means for detecting light deflected by the deflecting means arriving at a predetermined angle of deflection; and a deflection angle phase correction means included in the light scanning means for correcting the phase of change in angle of deflection caused by the deflecting means based at least on the mark detection signal from mark detection means and a standard angle detection signal from standard angle detection means.

In the present image forming apparatus, the light scanning means is configured to carry out light scanning onto the plurality of latent image bearing members such that at least one pair of neighboring visible image forming units of the plurality of visible image forming units are both subjected to light scanning by a same of deflecting means, and the endless intermediate transfer member is adapted to be displaced for a plurality of rounds of rotation such that the surface of the endless transfer member is superposed thereon with plural visible images each provided by the same of the visible image forming units during each round of rotation.

According to another aspect, the plurality of visible image forming units in the image forming apparatus each includes first and second image forming units to constitute a pair of neighboring visible image forming units, such that, after forming a double-color image by sequentially transferring to superpose plural visible images each formed by the first and second visible image forming units onto the surface of the endless intermediate transfer member during a first round of rotation of the endless intermediate transfer member, a quadruple-color image is formed by sequentially transferring to superpose plural visible images each formed by the first and second visible image forming units onto the double-color image during the second round of the endless rotation of the endless intermediate transfer member.

In addition, the light scanning means is configured, after storing a time lag dt1 as a difference between the time Ta when a mark detection signal is detected and the time Tb when the standard angle detection signal is detected during a first rotation of the endless intermediate transfer member, to measure the time lag dt2 as the difference between the time Tc when the mark detection signal is detected and the time Td when the standard angle detection signal is detected during the second rotation of intermediate transfer member, and 1to correct the phase based on time lag dt2 and time lag dt1 previously stored.

According to still another aspect, the light scanning means included in the image forming apparatus is configured to store in advance a predetermined base correction time;

initiate optical image writing for a first round of rotation of the endless intermediate transfer member onto the latent image bearing member included in the first visible image forming unit based on a standard angle detection signal detected after time Te determined as the time elapsed by base correction time t1 from time Ta;

correct the phase, during a period between time Tc and the time including time Tc elapsed by base correction time t1, based on time lag dt2 and time lag dt1; and initiate optical image writing for a second round of rotation of the endless intermediate transfer member onto the latent image bearing member included in the first visible image forming unit.

According to another aspect, the light scanning means is configured to store in advance a predetermined standard time difference ts, to compute a time difference Δt as the difference between time lag dt2 and time lag dt1, and, in a case where (standard time difference ts)≧(time difference Δt), not to correct the phase prior to optical image writing for a first round of rotation of intermediate transfer member onto the latent image bearing member included in the first visible image forming unit.

According to another aspect, in the case where it is decided that the correction of the phase is not to be implemented, the light scanning means is configured to initiate optical image writing for a second round of rotation of the endless intermediate transfer member onto the latent image bearing member included in the first visible image forming unit based on the time when the standard angle detection signal is detected firstly after a time that has elapsed by a predetermined time from Tc, and determine the predetermined time in comparison with the base correction time t1 based in at least time Tf when optical image writing is initiated for a first round of rotation of the endless intermediate transfer member onto the latent image bearing member included in the first visible image forming unit, time Te, base correction time t1, the time lags dt1 and dt2.

The process for determining time parameters such as the noted Te, Tf, t1, dt1, dt2 and others will be detailed herein below according to process requirements for image formation.

The image forming apparatus disclosed herein can offer several advantages over similar apparatuses previously known.

For example, the first and second process units included in the image forming apparatus constitute a pair neighboring with each other, each comprising two visible image forming means which are each in the relationship neighboring with each other.

In this apparatus, after forming a double-color image by sequentially transferring to superpose Y and M toner images each formed by the first and second process units onto the surface of the endless intermediate transfer member during a first round of rotation of the endless transfer member, a quadruple-color image is formed by sequentially transferring to superpose C and K toner images each formed by the first and second process units onto the double-color image during the second round of rotation of the endless intermediate transfer member.

In addition, the light scanning means 20 is configured, after storing the time lag dt1 during a first rotation of the endless intermediate transfer member, to measure the time lag dt2 during the second rotation of the endless intermediate transfer, and to correct the phase based on time lag dt2 and time lag dt1 previously stored.

As a result of the noted structure of the image forming apparatus, by correcting the phase of rotation in the main direction scanning during each round of the rotation based on time lags dt1 and dt2, the disagreement in images through quadruple superposition can be obviated.

Utilizing this image forming apparatus with the suitably determined time parameters such as Te, Tf, t1, dt1, and dt2, several difficulties encountered with the known similar apparatuses can now be obviated.

That is, there obviated with the present apparatus are the shear of superposed images in the vertical scanning direction, prolonged image forming periods resulted from a large number of rotation of intermediate transfer member, and undue complication in the structure of light beam scanning means caused by incorporating plural light deflecting means for exclusive use for each visible image forming units.

The present disclosure and features and advantages thereof will be more readily apparent from the following detailed description and appended claims when taken with drawings.

BRIEF DESCRIPTION OF THE DRAWINGS

In the following drawings, like references numerals will be used to refer to like elements in the various drawings, in which:

FIG. 5 includes a timing chart illustrating the generation and sequence of several signals in the printer disclosed herein;

FIG. 6 includes a timing chart illustrating the sequence of several signals in the case where the expressions "time lag dt1<time lag dt2" and "time difference tx<time difference ty" both hold;

FIG. 7 includes a timing chart illustrating the sequence of signals in the case where the expressions "time lag dt1<time lag dt2" and "time difference tx>time difference ty" both hold;

FIG. 8 includes a timing chart illustrating the sequence of signals in the case where the expressions "time lag dt1>time lag dt2" and "time difference tx>time difference ty" both hold;

FIG. 9 includes a timing chart illustrating the sequence of signals in the case where the expressions "time lag dt1>time lag dt2" and "time difference tx<time difference ty" both hold; and FIG. 10 includes a timing chart illustrating the sequence of signals during the operation for obviating the disagreement in image superposition in the case where a relatively large change arises in the speed of the intermediate transfer belt caused by belt slippage between the neighboring photoreceptors.

DESCRIPTION OF THE PREFERRED EMBODIMENTS

Figure 1:
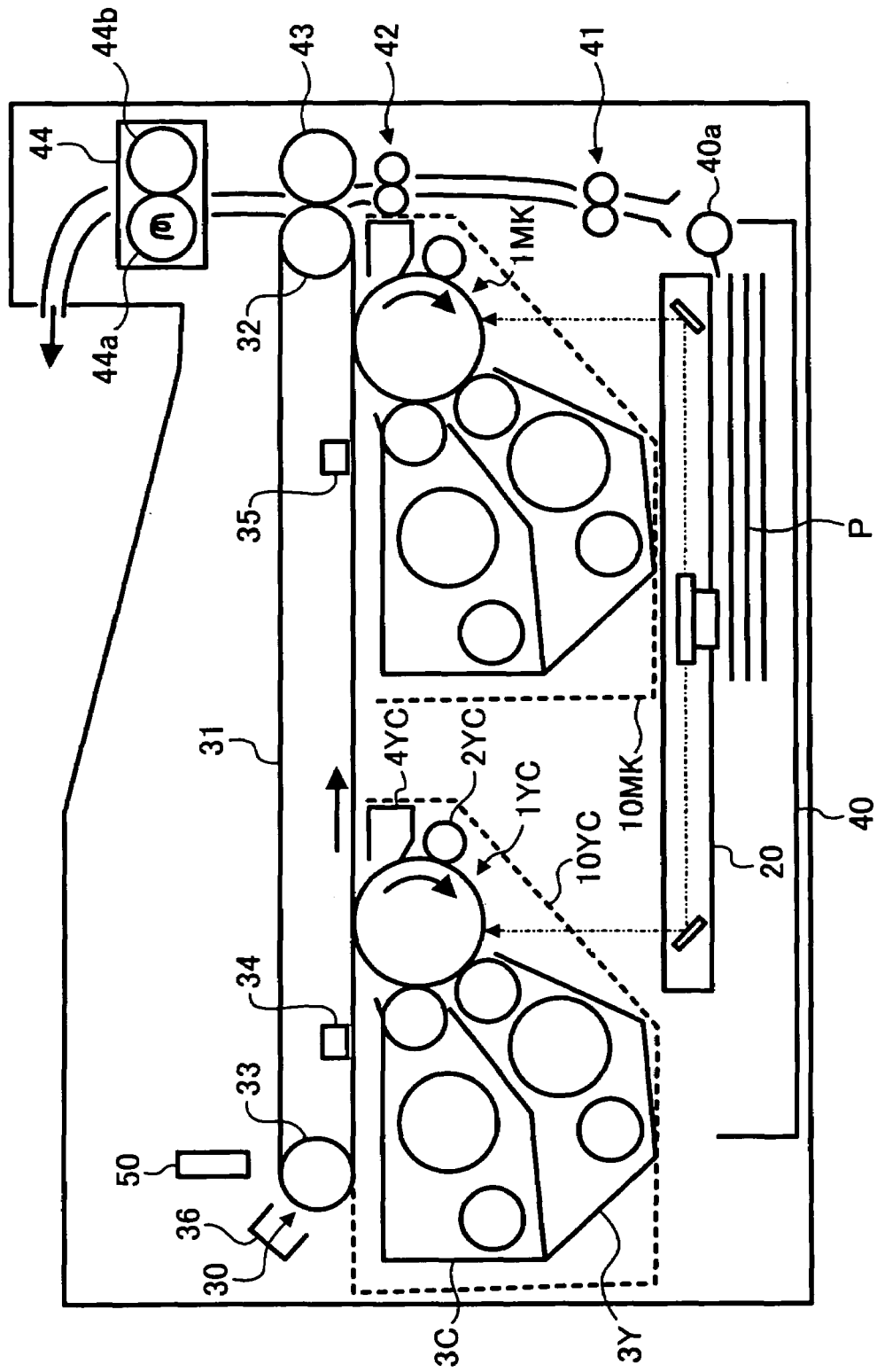
FIG. 1 is a diagrammatic schematic view illustrating the basic structure of a printer according to one embodiment disclosed herein.

In the detailed description which follows, specific embodiments of an image forming apparatus and light scanning means incorporated into the apparatus are primarily described.

It is understood, however, that the present disclosure is not limited to these embodiments. For example, it is appreciated that improved combination of the photoreceptor units and the light scanning means may also be adaptable to any form of image forming apparatus. Other embodiments will be apparent to those skilled in the art upon reading the following description.

In the present disclosure, an image forming apparatus is provided including at least a plurality of visible image forming units each including development means for developing to visualize latent images held on latent image bearing members; light scanning means for forming the latent image by deflecting light, emanated according to image information, by means of a deflecting means, to irradiate displacing surfaces of latent image bearing members; an intermediate transfer member provided with a endlessly displacing surface; a transfer means for transferring visible images formed by visible image forming means to be superposed thereon; a mark detection means for detecting a base mark affixed onto a predetermined location on the surface of intermediate transfer member; a standard angle detection means for detecting light deflected by the light scanning means arriving at a predetermined angle of deflection; and a deflection angle phase correction means included in the light scanning means for correcting the phase of change in angle of deflection caused by light scanning means based at least on a mark detection signal from mark detection means and a standard angle detection signal from standard angle detection means.

In the present image forming apparatus, the light scanning means is configured to carry out light scanning onto the plurality of latent image bearing members such that at least one pair of neighboring visible image forming units of the plurality of visible image forming units are subjected to light scanning both by a same of deflecting means, and the intermediate transfer member is adapted to be displaced for a plurality of rounds such that the surface of the transfer member is superposed thereon with plural visible images each provided by the same of the visible image forming units during each round.

In another aspect of the present disclosure, the plurality of visible image forming units in the image forming apparatus each includes first and second image forming units to constitute a pair of neighboring visible image forming units, such that, after forming a double-color image by sequentially transferring to superpose plural visible images each formed by the first and second visible image forming units onto the surface of intermediate transfer member during a first round of rotation of intermediate transfer member, a quadruple-color image is formed by sequentially transferring to superpose plural visible images each formed by the first and second visible image forming units onto the double-color image during the second round of rotation of intermediate transfer member.

In addition, the light scanning means is configured, after storing a time lag dt1 as a difference between the time Ta when a mark detection signal is detected and the time Tb when the standard angle detection signal is detected during a first rotation of intermediate transfer member, to measure the time lag dt2 as the difference between the time Tc when the mark detection signal is detected and the time Td when the standard angle detection signal is detected during the second rotation of intermediate transfer member, and to correct the phase based on time lag dt2 and time lag dt1 previously stored.

In still another aspect of the present disclosure, the light scanning means included in the image forming apparatus is configured to store in advance a predetermined base correction time; initiate optical image writing for a first round of rotation of intermediate transfer member onto the latent image bearing member included in the first visible image forming unit based on a standard angle detection signal detected after time Te as the time elapsed by base correction time t1 from Ta; correct the phase, during a period between time Tc and the time Tc elapsed by base correction time t1, based on time lag dt2 and time lag dt1; and initiate optical image writing for a second round of rotation of intermediate transfer member onto the latent image bearing member included in the first visible image forming unit.

In another aspect of the present disclosure, the light scanning means is configured to store in advance a predetermined standard time difference ts; to compute a time difference Δt as the difference between time lag dt2 and time lag dt1; and, in a case where (standard time difference ts)≧(time difference Δt), not to correct the phase prior to optical image writing for a first round of rotation of intermediate transfer member onto the latent image bearing member included in the first visible image forming unit.

In the case where it is decided that the correction of the phase is not implemented, the light scanning means is configured to initiate optical image writing for a second round of rotation of intermediate transfer member onto the latent image bearing member included in the first visible image forming unit based on the time when the standard angle detection signal is detected firstly after a time elapsed by a predetermined time from Tc, and determine the predetermined time in comparison with the base correction time t1 based on at least time Tf when optical image writing is initiated for a first round of rotation of intermediate transfer member onto the latent image bearing member included in the first visible image forming unit, time Te, base correction time t1, the time lags dt1 and dt2.

Also, in the case where it is decided that correction of the phase is not implemented, the light scanning means is configured to store in advance the time difference tx between the time Te and the time Tf, and determine the predetermined time based on at least magnitude relation of the time lags dt1 and dt2, and the time difference tx.

Alternatively, also in the case where it is decided that correction of the phase is not implemented, the light scanning means is configured to store the sum of the time difference tx and the base correction time t1 as an added correction time t1', and determine the predetermined time based on at least magnitude relation of the time lags dt1 and lag dt2, and the added correction time t1'.

In another aspect, the image forming apparatus disclosed herein further includes a plurality of base marks equally spaced with a predetermined pitch there between each affixed onto the intermediate transfer belt member in the direction of endless rotation, in which, in the case where optical image writing for a first round of rotation of the intermediate transfer member onto the latent image bearing member included in the first visible image forming unit is completed at the time Tg when a predetermined number of the mark detection signals are detected after the time Ta, the light scanning means is configured to correct the phase, during the period between the time Tg and the time after time Tg elapsed by the base correction time t1, based on the time lag dt3 between time Tg and the time when the standard angle detection signal is detected firstly after time Tg, and the time lag dt1; and to initiate optical image writing for the first round of rotation of intermediate transfer member onto the latent image bearing member included in the second visible image forming unit.

In the case where optical image writing for a second round of rotation of intermediate transfer member onto the latent image bearing member included in the first visible image forming unit is already completed at the time Th when anyone of the mark detection signals is detected after the time Tc, the light scanning means is configured to correct the phase, during the period between the time Th and the time after time Th elapsed by the base correction time t1, based on the time lag dt4 between the time Th and the time when the standard angle detection signal is detected firstly after the time Th, and the time lag dt2; and initiate optical image writing for the second round of rotation of intermediate transfer member onto the latent image bearing member included in the second visible image forming unit.

In another aspect, the image forming apparatus disclosed herein further includes a first mark detection means as the mark detection means, and a second mark detection means for detecting the base mark situated between first and second visible image forming units, in which, in the case where optical image writing for a first round of rotation of intermediate transfer member onto latent image bearing member included in the first visible image forming unit is already completed at the time Ti when a mark detection signal is detected by the second mark detection means after the time Ta when a previous mark detection signal is detected by the first mark detection means, the light scanning means is configured to correct the phase, during the period between the time Ti and the time after time Ti elapsed by the base correction time t1, based on the time lag dt5 between the time Ti and the time when the standard angle detection signal is detected firstly after time Ti, and the time lag dt1; and initiate optical image writing for the first round of rotation of intermediate transfer member onto the latent image bearing member included in the second visible image forming unit.

In the case where optical image writing for the second round of rotation of intermediate transfer member onto latent image bearing member included in the first visible image forming unit is already completed at the time Tj when a mark detection signal is detected by the second mark detection means after the time Tc when a previous mark detection signal is detected by the first mark detection means, the light scanning means is configured to correct the phase, during the period between the time Tj and the time after time Tj elapsed by the base correction time t1, based on the time lag dt6 between the time Tj and the time when the standard angle detection signal is detected firstly after time Tj, and the time lag dt2; and initiate optical image writing for the second round of rotation of intermediate transfer member onto the latent image bearing member included in the second visible image forming unit.

In another aspect, the light scanning means included in the image forming apparatus is configured, in the case where the image information is of double-color images which are formed by superposing first color images formed by the first visible image forming unit and second color images formed by the second visible image forming unit, to initiate optical image writing onto latent image bearing member included in the first visible image forming unit based on the time when the standard angle detection signal is detected firstly after the time Ta without waiting for the arrival of the time Te.

In addition, the image forming apparatus further includes a plurality of development means included in each of the first and second visible image forming units, and a development effecting means for selectively enabling one of the first and second visible image forming units, in which, in the case where the double-color images can be formed of the first color which can be developed anyone of the plurality of development means included in the first visible image forming unit and of the second color which can be developed anyone of the plurality of development means included in the second visible image forming unit, the first and second visible image forming units are each configured to enable the first color and the second color by selectively enabling one of the plurality of development means included in each of the first and second process units, respectively, by the development effecting means.

The above noted features of the image forming apparatus and light scanning means incorporated into the apparatus have been materialized through the findings and efforts by the present inventors toward acquiring and improving these features, which follows.

By way of example, the image forming apparatus described earlier is adapted to perform light beam scanning using polygonal mirrors for exclusive use onto respective latent image bearing members of visible image forming means. In addition, each of the polygonal mirrors is provided with plural beam detection means corresponding thereto.

With this construction of the image forming apparatus, the superposition repeated as many times as required can be carried out during one or fewer round of the rotation of intermediate transfer means, and the image disagreement during superposition along the repeated rotation of intermediate transfer means can be obviated.

However, another drawback may arise in contrast such as the phase shift in the main scanning direction among the plural visible image forming means and the shear of superposed images in the vertical scanning direction caused by the change in the speed of the surface of intermediate transfer belt.

If light beam scanning is carried out for plural latent image bearing members by means of one single light deflecting means, the shear of superposed images in the vertical scanning direction can be obviated, since the phase in the main scanning direction among the plural visible image forming means is synchronized as long as no change in the speed of the surface of intermediate transfer belt is present.

It is quite difficult, however, to prevent in practice the change in the speed of the surface of intermediate transfer belt. In the noted image forming apparatus, in particular, it is common to utilize a belt as the intermediate transfer means in order to fulfill the layout designing requirements such that all of the photoreceptor units are positioned being opposed to the surface of the intermediate transfer means, while the apparatus is designed in its size reduced as much as possible.

Since this intermediate transfer belt may be suffered from slippage on the drive roller with more ease compared with an intermediate transfer drum, this may arise the change in the speed of the surface of intermediate transfer belt.

The present inventors then have found in the case where four process units for Y, M, C, and K images are provided the disagreement in the position of toner image transfer may take place more often between a first color and a fourth color, which are positioned most distant among the four units. In contrast, the disagreement can be suppressed more between most neighboring pairs of the units such as, for example, a first color and a second color.

This is considered due to the fact that, in the neighboring pair formed of two photoreceptors adjacent with each other, the change in the speed of the surface of intermediate transfer belt between the two rarely takes place, or may take place with small speed change, if any, because of the short distance between the two photoreceptors.

In the present disclosure, therefore, the disagreement in the position of toner image transfer in the main direction scanning can effectively be suppressed by using one single deflecting means for at least one neighboring pair, and by bringing into coincidence the phase in that direction between the two visible image forming means.

In addition, the present structure facilitates to obviate more complicated structure of the light scanning means otherwise required with plural deflecting means each for exclusive use.

Furthermore, the superposing image transfer is carried out not during one or less round of surface displacement of intermediate transfer means, still resulting in the number. rotation less than that of superposition. This is because image superposition by the plural visible image forming means is carried out in addition to that by the surface displacement.

In the case of forming a full-color image, for example, after forming a double-color image by sequentially transferring to superpose Y and M toner images each formed by the first and second process units onto the surface of intermediate transfer belt during a first round of rotation of the transfer belt, a quadruple-color image is formed by sequentially transferring to superpose C and K toner images each formed by the first and second process units onto the double-color image during the second round of rotation of intermediate transfer belt. As a result, an increase in printing time can be avoided, which is otherwise required for repeated rotations of as many times as the number of images transferred.

Still in addition, through correcting the phase of the change in beam deflection angle by means of deflection angle phase correction means based on mark detection, and beam detection signals, undue mismatch in image superposition can also be prevented, which is caused by the shift in the phase in the main scanning direction along the rounds of belt rotation.

As a result, the difficulties described earlier can be obviated, by the image forming apparatus disclosed herein, such as the shear of superposed images in the vertical scanning direction, prolonged image forming periods resulted from rotating an intermediate transfer member as many times as the number of image superposition, and undue complication in the structure of light beam scanning means caused by incorporating plural light deflecting means for exclusive use for each visible image forming units.

As an exemplary embodiment of image forming apparatus according to the present invention, a printer of the electrophotographic type will be described herein below.

FIG. 1 is a diagrammatic schematic view illustrating the basic structure of the printer.

Referring to FIG. 1, this printer includes at least a first process unit 10YC for forming Y and T toner images, and a second process unit 10MK for forming M and K toner images. It may be added according to conventional notation that the signs Y, M, C, and K designate four color members of, yellow, magenta, cyan, and black, respectively (which will be used throughout the following description).

In addition to the two process units as visible image forming means (10YC and 10MK), the printer further includes a light scanning means 20, an intermediate transfer means 30, and a sheet cassette 40 as sheet feeding means. Also included as conveyor means are a conveyor roller pair 41, a registration roller pair 42, a secondary transfer bias roller 43, and a fixing means 44.

The first process unit 10YC includes at least a photoreceptor unit 1YC as latent image bearing member, a charging means 2YC, two developing means 3Y and 3C, a cleaning means 4YC, and a discharging means (not shown). In addition, the unit 10YC also includes a development effecting means (not shown) for enabling the operation of either one of the two developing means 3Y and 3C by selectively displacing with respect to the photoreceptor unit 1YC.

Since the second process unit 10MK has the structure similar to the first process unit 10YC, its detailed description is abbreviated herein.

The charging means 2YC included in the first process unit 10YC is adapted to uniformly charge the surface of the photoreceptor 1YC through rubbing and contact with a charging roller.

Onto thus charged surface of the photoreceptor 1YC, laser light beams are scanned, which are modulated and deflected by the light scanning means 20. Electrostatic latent images for Y or C image are now formed on the charged surface of the photoreceptor 1YC.

The thus formed latent images are subsequently subjected to the development process for forming visible images such as either Y toner image by developing means 3Y or C toner images by the means 3C.

Incidentally, other type of the charging means may alternatively be utilized such as by a charger or a brush in place of the noted charging roller.

The developing means 3Y and 3C includes Y and C developing agents, respectively, which consist of magnetizable developer mix including magnetic carrier granules and, Y and C toner particles.

In addition, the developing means 3Y and 3C are further provided with a developing roller, which is positioned being exposed partially from an opening of a developer case, a stir means for stirring the Y and C developing agents, toner concentration sensors (which is hereinafter referred to as T sensors) and so on.

Being transported to the developing roller while stirring by the stir means, Y and C toners in the developing agents are each friction-charged, and subsequently held onto the face of developing roller.

The Y and C toners are each controlled in its layer thickness on the developing roller by a control means (not shown), brought to developing regions corresponding to the photoreceptor 1YC, and then held onto the electrostatic latent images. Y or C toner images are thus created on the photoreceptor 1YC.

The Y and C developing agents are each brought back by the rotating developing roller to the container of developing means 3Y and 3C with decreased concentration of Y and C toners resulted from the consumption during toner image development process.

The T sensors are each provided with magnetic permeability sensors which are configured to output voltages according to magnetic permeability of the Y and C developing agents, which are transported while stirring by the stir means as noted earlier. The magnetic permeability is correlated to the toner concentration to a certain extent. Therefore, the T sensors are operative of outputting voltages according to Y and C toner concentration in the developing agents.

The values of the output voltages are then sent to a replenish control unit (not shown). The replenish control unit, in turn, is provided with RAM as a memory unit which is configured to store several data as target output voltages, Vtref, for the Y and C toners.

In addition, the replenish control unit is configured also to store further data of Vtref for the M and K toners included in the second process unit 10MK.

As an example, the Vtref for Y toner is then utilized for controlling the drive of Y toner dispensing unit (not shown). To be concrete, the noted replenish control unit is adapted to drive and control the Y toner dispensing unit for replenishing Y toner particles into the developing means 3Y such that voltage values output from the sensor for Y toner are brought to coincide with, or to be close as much as possible to, the noted output voltage Vtref for the Y toner.

The replenishing step for the Y toner thus facilitates to maintain the concentration of Y toners within a predetermined range. In a similar manner, the concentration is properly adjusted and maintained for other M, C, and K developing agents as well.

The Y and M toner images formed on the photoreceptor 1YC are then subjected to intermediate transfer onto an intermediate transfer belt 31 which will be described later on. The surface of the photoreceptor 1YC following the intermediate transfer is cleaned by removing residual toners by the cleaning means 4YC, and discharged by irradiating light emanated from a discharging lamp.

Thereafter, the surface of the photoreceptor 1YC is uniformly charged by the charging means 2YC and prepared for the next image forming step.

The intermediate transfer means 30 is provided with an intermediate transfer belt 31, a drive roller 32, a driven roller 33, first and second intermediate transfer chargers 34 and 35, and a belt cleaning means 36.

The intermediate transfer belt 31, as an endless belt being suspended and tension wound, is adapted to be driven to rotate counterclockwise as shown in the drawing by a drive system (not shown). The first and second intermediate transfer chargers 34 and 35 are positioned on the inner periphery of intermediate transfer belt 31 so as to oppose to the first and second process units 10YC and 10MK, respectively, with the belt 31 interposed there between.

This opposing positional relationship between the transfer chargers 34 and 35, and process units 10YC and 10MK, now forms first and second intermediate transfer positions, respectively.

In each of first and second intermediate transfer positions, an intermediate transfer electric field is generated by electrical charge transfer from the intermediate transfer chargers 34 and 35 to the intermediate transfer belt 31.

The Y toner images previously formed on the photoreceptor 1YC for Y, C images are subjected to intermediate transfer onto an intermediate transfer belt 31 under the influence of the intermediate transfer electric field.

Subsequently, M toner images separately formed on the photoreceptor 1MK for M, K images by the second process unit 10MK are subjected to intermediate transfer onto the thus formed Y toner images, whereby a sequential overlap of color toner images of Y and M toner images are formed.

Thereafter, the double-color toner images formed as the overlap of Y and M toner images are brought to coincide with (or brought back to) the position of the first intermediate transfer after approximately one circle along the endless rotation of the intermediate transfer belt 31.

During the time for the double-color toner images be brought back, electrostatic latent images for forming C toner, which are previously formed on the photoreceptor 1YC for Y, C images, are developed to form C toner images by the development means 3C for C images.

Subsequently, the C toner images are subjected to intermediate transfer to form another sequential overlap on top of the double-color toner images in the first intermediate transfer position. As a result, triple-color toner images formed on the intermediate transfer belt 31.

In a similar manner, another toner images are further subjected to intermediate transfer to form a further sequential overlap on top of the triple-color toner images in the second intermediate transfer position, whereby quadruple-color toner images are formed.

Thereafter, the quadruple-color toner images are collectively subjected to the secondary transfer onto a transfer paper P as a recording member at a secondary transfer nip, which will be detailed later on.

Being combined with the white color of transfer paper P, a full-color pictorial image is now resulted from the quadruple-color toner images.

Residual toner particles, which are in existence on the surface of intermediate transfer belt 31 following the passage through the secondary nip, are subsequently cleaned by a belt cleaning means 36 which is provided in contact with the portion of the belt 31 supported from the behind by the driven roller 33.

Being situated under the light scanning means 20, a sheet feeding cassette 40 is provided for loading plural transfer paper sheet P stacked as a batch with an uppermost sheet thereof being pressed against the sheet feeding roller 6a.

When the feeding roller 6a is driven to rotate at a predetermined timing, the uppermost transfer sheet is fed forward to a sheet feeding path.

A secondary transfer bias roller 43 is further provided to be brought into pressed contact with the drive roller 32 included in the intermediate transfer means 30 with the intermediate transfer belt 31 interposed there between, whereby a secondary transfer nip is formed. To the secondary transfer bias roller 43, secondary transfer biases are applied by an electrical power source (not shown).

The transfer sheet P forwarded from sheet feeding cassette 40 to sheet feeding path is fed through conveyor roller pair 41 and nipped by the registration roller pair 42.

On the other hand, the quadruple-color toner images previously formed on the intermediate transfer belt 31 advance into the secondary transfer nip along the endless rotation of the intermediate transfer belt 31.

The registration roller pair 42 then operates to feed the transfer sheet P nipped therewith forward to the secondary transfer nip in the timing suitable for bringing the sheet P in close contact with the quadruple-color toner images. As a result, the quadruple-color toner images are adhered closely to transfer sheet P, and subjected to the secondary transfer onto the transfer sheet P under the influence of secondary transfer biases and nip pressure, to thereby form a full-color pictorial image.

The transfer paper sheet P with the thus formed full-color pictorial image is forwarded to the fixing means 44.

The fixing means 44 is provided with a heated roller 44a and a pressing roller 44b, which are brought into contact with one another to form a fixing nip, in that the constituent rollers are driven such that the surfaces thereof in combination can generate a resultant forwarding movement of the sheet paper through the nip.

The fixing means 44 operates to have the forwarded paper sheet P nipped by the fixing nip and the full-color pictorial image fixed onto the face of the transfer sheet. After the passage through the fixing means 44, the paper sheet P is discharged to the exterior of the apparatus.

A base mark (not shown) is affixed onto a predetermined location of one of the circumferential edges of the intermediate transfer belt 31. Corresponding to this base mark, a mark detection means 50 is provided, comprising a reflection type photosensor and being positioned over the intermediate transfer means 30 as shown in the drawing.

Mark detection signals generated by the mark detection means 50 are transmitted to a main controller (not shown). Based on the mark detection signals, there generated are optical writing initiation signals in the vertical scanning direction to be directed to respective photoreceptors 1YC and 1MK included in the process units 10YC and 10MK, respectively.

It should be noted that the first and second process units 10YC and 10MK constitute a pair neighboring with each other, each comprising two visible image forming means which are each in the relationship neighboring with each other.

In addition, each of the process units is provided with a development shifting means, as the development effecting means noted earlier, capable of enabling (or disabling) the operation of either one of the two visible image forming means by selective displacement.

With such a construction as note just above of the process units, after the first process unit 10YC enabled the development means 3Y for Y images and carried out the Y development during the first round of the transfer belt, the development means 3C for C images performs C development during the second round.

Similarly, after the second process unit 10MK enabled the development means 3M for M images and carried out the M development during the first round of the transfer belt, the development means 3K for K images performs K development during the second round.

In the next place, characteristic features will be detailed on the printer disclosed herein.

Figure 2:
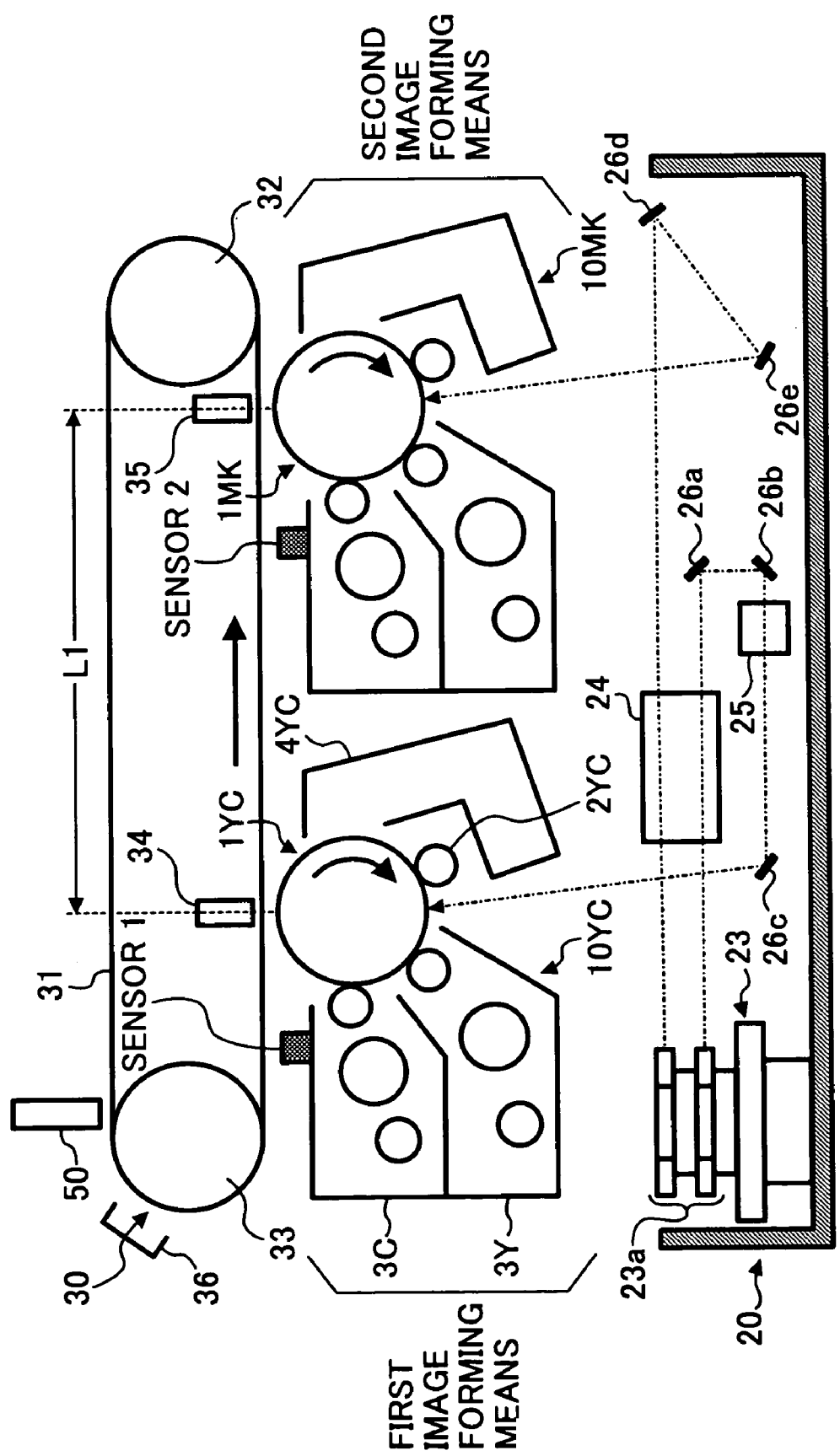
FIG. 2 is an enlarged view illustrating several units included in the printer such a light scanning means, two process units, and intermediate transfer means.

FIG. 2 is an enlarged view illustrating several units included in the printer such as the light scanning means 20, two process units 10YC and 10MK, and intermediate transfer means 30.

The light scanning means 20 includes at least two laser diodes (not shown, which are hereinafter refereed to as LDs) as light sources, a polygonal unit 23 as a deflecting means, first and second collimator lenses 24 and 25, and four reflecting mirrors 26a, 26b, 26c, and 26.

In addition to polygonal mirrors 23a's, the polygonal unit 23 includes a polygon motor and a polygon motor controller (not shown).

One of the LDs operates to emanate laser beams L1 after modulated by a modulation means (not shown) according to Y and C image information.

Figure 3:
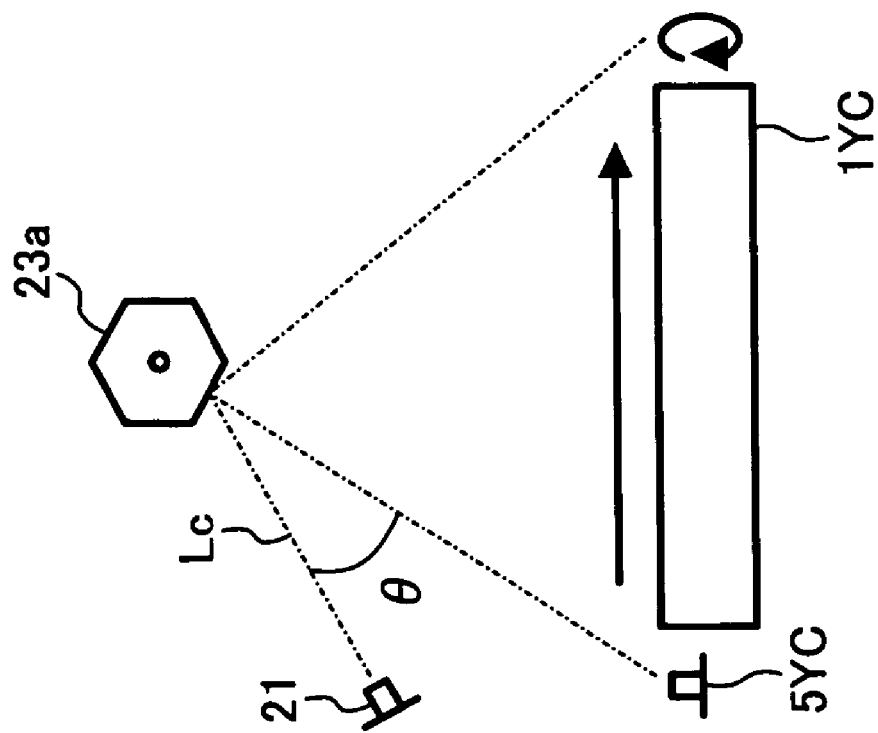
FIG. 3 is an enlarged view illustrating the light scanning means included in the printer.

Being reflected by one of six deflecting faces of the mirror 23a, which is positioned just above the face deflecting the beams L1, as shown in FIG. 2, the emanated laser beams L2 are deflected successively in the main (or horizontal) scanning direction as shown in FIG. 3.

Subsequently, as shown in FIG. 2, the beams L1 are collimated through the first collimator lens 24, and then reflected successively by the first and second reflecting mirrors 26a and 26b.

Furthermore, after collimated though the second collimator lens 25 and reflected by the reflecting mirror 26c, the beams L1 are scanned in the horizontal scanning direction over the surface area of the photoreceptor 1YC of first process unit 10YC.

Every time the deflecting (and reflecting) face reflecting laser beams is switched from one to another with the rotation of polygonal unit 23, the beams L1 are adapted to be scanned once in the horizontal scanning direction over the surface area.

In addition, every moment when the laser beams L1 are reflected to a predetermined direction during each scanning, the beams are detected by a first beam detection means 5YC, as the base mark detection means, provided on a side of the photoreceptor 1YC.

The light scanning in the vertical scanning direction is carried out with the displacement of the surface of photoreceptor 1YC in that direction. And, the first beam detection means 5YC is adapted to output a first beam detection signal every time the beams are detected.

The other LD operates to emanate laser beams L2 after modulated by the modulation means (not shown) according to M or K image information. Being reflected by one of six deflecting faces of the rotating polygonal mirror 23a, as a regular hexagonal prism, the emanated laser beams L1 are deflected successively in the horizontal scanning direction as shown in FIG. 3.

Subsequently, the beams L2 are collimated through the first collimator lens 24, reflected successively by the fourth and fifth reflecting mirrors 26d and 26e, and scanned in the horizontal scanning direction over the surface area of the photoreceptor 1MK of second process unit 10MK.

Every moment when the laser beams L2 are reflected to a predetermined direction during each scanning, the beams are detected by a second beam detection means (not shown), provided on a side of the photoreceptor 1MK. A second beam detection signal is then output by the second beam detection means.

Referring again to FIG. 1, the light scanning means 20 is adapted to carry out light scanning by means of one single polygonal unit 23 onto both receptors, one the 1YC photoreceptor for Y and C images included in the first process unit 10YC and the other the 1MK photoreceptor for M and K images included in the second process unit 10MK.

As a result, the phase of light scanning in the main scanning direction comes to completely coincide with each other between the 1YC photoreceptor for Y and C images and the 1MK photoreceptor for M and K images.

The notation L1 in the drawing designates the distance between two photoreceptors. This distance, the traveling speed of the intermediate transfer belt 31, and scanning speed in the main scanning direction with the light scanning means 20 (related to the rotational speed of polygonal unit 23) are selected in combination as follows. Namely, the number of beam scanning repetition in the main scanning direction during the time period for the intermediate transfer belt 31 to travel the distance L1 is set to be an integer.

With this setting, disagreement can be alleviated in image overlap or superposition caused by undue shift in the phase of scanning in the main scanning direction between two photoreceptors.

However, even such a setting as above is made to bring the initiation timings for beam scanning to coincide exactly with each other between two photoreceptors, that is, even after initial positional disagreement of toner images is dissolved between the photoreceptors, possibility still remains of disagreement in image overlap.

This disagreement may be caused by the change in the speed of the surface of intermediate transfer belt 31, in that the position of toner image transfer in relative to the intermediate transfer belt becomes to disagree between the first and second intermediate transfer positions.

In addition, in the case where four process units for Y, M, C, and K images are provided, this disagreement may take place more often between a first color and a fourth color, which are positioned most distant among the four units. In contrast, the disagreement does not take place so often between most neighboring pairs of the units such as, for example, a first color and a second color.

Therefore, it is realized for the printer disclosed herein to be able to effectively suppress the noted disagreement in the position of toner image transfer caused by the change in the speed of the surface of intermediate transfer belt, since it consists of only one pair of the process units 10YC and 10MK neighboring to each other.

In addition, with the construction of the present printer, in which one single polygonal unit 23 is shared by neighboring process units, there alleviated is more complicated structure of the light scanning means 20 otherwise required for the printer provided with plural polygonal units each for exclusive use.

As described earlier, the printer disclosed herein is adapted to complete the superposing image transfer not during one or less round of surface displacement of intermediate transfer belt 31 but during two rounds of the displacement, and four superposing transfers are in fact carried out during that period.

Namely, the image transfers are carried out more times than the number of round of transfer belt 31 for the printer, in which the transfer operation by two process units are included in addition to that by the rotation of the transfer belt 31. As a result, an increase in printing time can be avoided, which is otherwise required for repeated rotations of as many times as the number of images transferred.

Figure 4:
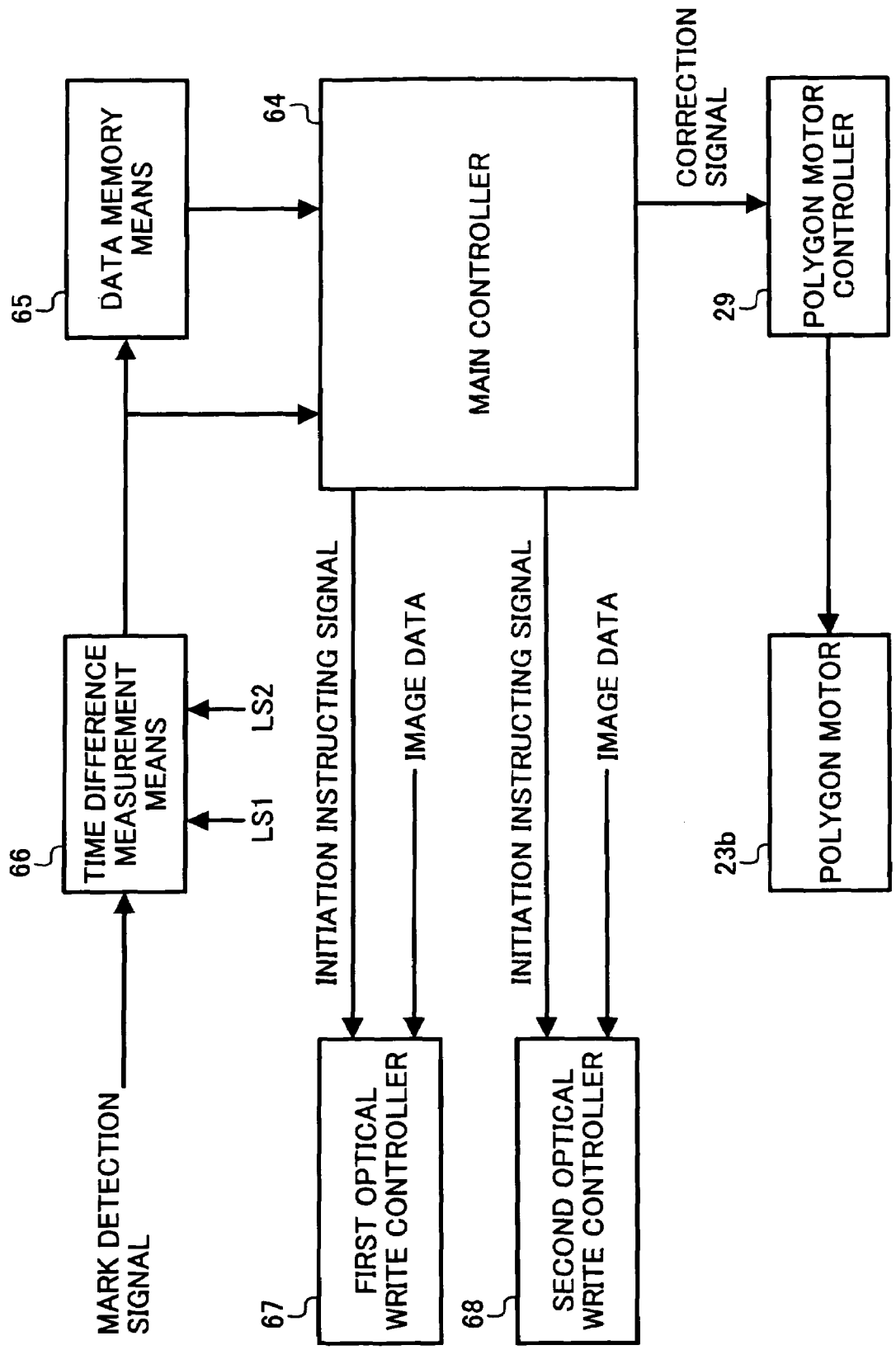
FIG. 4 is a diagrammatic block diagram illustrating portions of circuit construction of the printer disclosed herein.

FIG. 4 is a diagrammatic block diagram illustrating portions of circuit structure of the printer disclosed herein.

Referring to FIG. 4, connected to a main controller 64 are a data memory means 65 comprising RAM, a time lag measurement means 66, first and second optical write controllers 67 and 68, and a polygon motor controller 29.

In addition, the polygonal motor 23b is connected to the polygonal motor controller 29. Also connected to time lag measurement means 66 are the mark detection means (50 of FIG. 1), the first beam detection means (5YC of FIG. 1), and the second beam detection means as base mark detection means for the second process unit (10MK).

These noted units consist of a portion of the light scanning means 20. In other word, the light scanning means 20 is adapted to include the main controller 64 and others in addition to the polygonal unit 23.

The main controller 24 is adapted to output start instruction signals in a predetermined timing to the first and second optical write controllers 27 and 28.

On receiving start instruction signals, the first optical write controller 27 instructs to control the drive of the first LD based on image information so as to initiate optical writing onto the photoreceptor 1YC of first process unit 10YC. Similarly, the second optical write controller 28 instructs to control the drive of the second LD based on image information so as to initiate optical writing onto the photoreceptor 1MK of second process unit 10MK YC on receiving the start instruction signals.

The main controller 24 is adapted also to output correction signals in a predetermined timing to the polygonal motor controller 29. The polygonal motor controller 29, in turn, instructs the polygonal motor 23b including a stepping motor to adjust the number of step pulses thereof so as to suitably shifting the rotational phase of the motor 23b based on the correction signals. This also yields the shift of rotational phase for the polygonal motor 23b.

With this structure, the main controller 24 and polygonal motor controller 29 are adapted to serve as deflection angle phase correction means for correcting the phase of the change in beam deflection angle based at least on mark detection, and beam detection signals.

As described earlier, the mark detection means 50 is adapted to output mark detection signals on detecting a base mark affixed at a predetermined location on the intermediate transfer belt 31.

In the course of two rounds of intermediate transfer belt 31 and superposing transfers of four color images onto the surface of the belt 31, the noted time lag measurement means 66 carries out several measurements as follows.

Namely, a first time lag dt1 as the difference between the time Ta when a mark detection signal is detected during the first rotation of the belt 31 and the time when the first mark detection signal from the first beam detection means is firstly detected, and the result from this measurement is output to be stored in the data memory means 65.

Subsequently, a second time lag dt2 as the difference between the time Tc when a mark detection signal is detected during the second rotation of the belt 31 and the time when a first beam detection signal is detected firstly after detecting the mark detection signal, and the result from this measurement is output to the main controller 64.

FIG. 5 includes a timing chart illustrating the generation and sequence of several signals in the printer disclosed herein.

As described earlier, the sequential transfer of Y images on first process unit 10YC and M images on second process unit 10MK is carried out during the first rotation of the intermediate transfer belt 31.

After the rotation of the belt 31 is initiated to carry out the transfer, the base mark onto the transfer belt 31 is detected by the mark detection means 50.

Upon outputting a mark detection signal in response to the detection, the time Ta is recognized by the time lag measurement means 66, and a time-keeping for measuring the first time lag dt1 is initiated. In addition, another time-keeping for measuring a base correction time t1 stored in the data memory means 65 is also initiated. The base correction time t1 is set to be equal to, or longer than the time required to shift the phase of the main direction scanning by one cycle by means of the control with the polygon motor controller 29.

Incidentally, since the polygonal mirror 23a is of the shape of the regular hexagonal prism, the noted time required to shift the phase of the main direction scanning by one cycle is equal to that for shifting the phase of polygonal mirror rotation by 60 degrees.

On outputting a first beam detection signal firstly after the time Ta, another time Tb is recognized by the time lag measurement means 66, and then the time-keeping for measuring the first time lag dt1 is terminated. And, the result of this time-keeping is stored in the data memory means 65.

Subsequently, at the moment when time-keeping for measuring the base correction time t1 is terminated (or when the time t1 elapses after Ta), the time Te (FIG. 5) is recognized by the time lag measurement means 66.

Thereafter, only at the moment when a first beam detection signal is output firstly after Te and when a light beam is brought to the proper location in the main scanning direction for initiating optical image writing onto the photoreceptor 1YC for Y and C images, optical image writing steps with the photoreceptor 1YC are initiated.

Subsequently, by carrying out the sequential transfer of Y images formed by the first process unit 10YC and M images by the second process unit 10MK, double-color toner images are formed on the intermediate transfer belt 31.

Thereafter, C images formed by the first process unit 10YC and K images by the second process unit 10MK are sequentially transferred onto the double-color toner images.

Upon outputting a mark detection signal for the second round during that period of transfer, the time Tc (FIG. 5) is recognized by the time lag measurement means 66, and a time-keeping for measuring the second time lag dt2 is initiated. In addition, another time-keeping for the base correction time t1 is also initiated.

On outputting a first beam detection signal firstly after the time Tc, another time Td is recognized by the time lag measurement means 66, and then the time-keeping is terminated.

The main controller 24 then operates to compute a time difference Δt between the value of the second time lag dt2 sent from the time lag measurement means 66 and that of first time lag dt1 stored previously in the data memory means 65.

Based on the thus computed time difference Δt, the discrepancy in phase of the scanning in the main scanning direction between the first and second rounds are computed, and the result from this computation is output, as correction signal (s), to the polygon motor controller 29.

The polygon motor controller 29, in turn, operates to vary the number of step pulses applied to the polygon motor 23b so as to correct the phase of rotation for the polygonal mirror 23a.

By this correction, the scanning phase in the main scanning direction for the second round is brought to coincide with that for the first round within the period of base correction time t1 during the second round.

As a result, after the elapse of base correction time t1 during the second round, first detection signals for the second round are adjusted to be sent out repeatedly having the same timing as the first round, as shown in FIG. 5.

As described earlier, only at the moment when a first beam detection signal is output firstly after Te, optical image writing steps with the photoreceptor 1YC are initiated and similar steps are carried out for the time Tm.

Therefore, the timing for initiating optical image writing steps with the photoreceptor 1YC for Y and C can be synchronized with each other between the first and second rounds of the belt rotation.

As a result, undue mismatch in image superposition in the vertical scanning direction can be obviated, which is caused by the shift in the phase in the main scanning direction along the rounds of belt rotation. Furthermore, another mismatch in image superposing positions by respective process units in the main scanning direction can also be prevented, which is caused by the variation in the belt surface velocity.

Having described the present disclosure in general, the following examples are provided further to illustrate preferred embodiments of the printer disclosed herein each provided with specific features.

EXAMPLE 1

The time difference Δt between the first time lag dt1 and second time lag dt2 also indicates the amount of difference in phase of the rotation of transfer belt in the main scanning direction between the first and second rotations.

Therefore, as long as the time difference Δt is equal to, or less than, a predetermined threshold value, the mismatch in image superposition in the vertical scanning direction can be contained within a tolerance limit in principle, even without correcting the rotation phase during the second rotation in the main scanning direction.

Accordingly, the printer of Example 1 is adapted such that predetermined data for the standard time difference ts are stored in data memory means 65 in advance and that, in the case where the expression "standard time difference ts≧time difference Δt" holds, the phase correction steps are not carried out prior to the initiation of the second belt rotation in the main scanning direction.

This adaptation of the printer, however, has to be examined closer, since the noted simple omission of those correcting steps may give rise to color drift (or color mismatch) exceeding a tolerance limit, which is possibly caused depending on the relative magnitude of the two time lags dt1 and dt2.

The reasons for this possible color mismatch will be described herein below for the case where the standard time difference ts is equal to one quarter of main scanning period T, by way of example.

FIG. 6 includes a timing chart illustrating the sequence of several signals in the case where the expressions "time lag dt1<time lag dt2" and "time difference tx<time difference ty" both hold.

This time difference tx designates the difference in time between the time Te elapsed by base correction time t1 from the mark detection signal during the first round and the time Tf when a first beam detection signal is output firstly after Te for optical image writing be initiated.

In addition, the time difference ty designates the difference between the time Tm elapsed by base correction time t1 from the mark detection signal during the second round and the time Tn when a first beam detection signal is output firstly after Tm for the optical image writing be initiated.

In the case where the expressions "time lag dt1<time lag dt2" and "time difference tx<time difference ty" are both satisfied, the time Tf for the first round of the belt rotation advances with respect to the time Tn for the second round, as shown in FIG. 6.

In this case, although the first line (a line image extending along the main scanning direction) for the second rotation is shifted by one quarter of the dot width backward from that for the first rotation, this magnitude of image mismatch is within the tolerance limit.

In contrast, FIG. 7 includes a timing chart illustrating the sequence of signals in the case where the expressions "time lag dt1<time lag dt2" and "time difference tx>time difference ty" both hold.

In similar manner to FIG. 6, the time difference tx designates the difference in time between the time Te elapsed by base correction time t1 from the mark detection signal during the first round and the time Tf when a first beam detection signal is output firstly after Te for optical image writing be initiated, and the time difference ty designates the difference between the time Tm elapsed by base correction time t1 from the mark detection signal during the second round and the time Tn when a first beam detection signal is output firstly after Tm for the optical image writing be initiated.

In the case where the expressions "time lag dt1<time lag dt2" and "time difference tx>time difference ty" are both satisfied, the time Tn for the second round of the belt rotation advances with respect to the time Tf for the first round, as shown in FIG. 7.

Even the time difference Δt remains as one quarter of the main scanning period T in this case, the magnitude of image mismatch is not necessarily contained within one quarter of the dot width, and the color mismatch as large as about one dot width may result depending on the relative magnitude of the two time lags dt1 and dt2.

It is indicated from the comparison between FIGS. 6 and 7, in order to contain the magnitude of color mismatch within the tolerance limit of one quarter of the dot width in the case of "time lag dt1<time lag dt2", it is necessary to delay the time for initiating optical image writing for the second round is adjusted to be delayed with respect to that for the first round.

Also indicated from FIG. 7 is that, in the case of "time difference tx>time difference ty", the color mismatch can be contained within one quarter of the dot width, when the time for initiating optical image writing for the second round is delayed by one period T from the time Tn.

FIG. 8 includes a timing chart illustrating the sequence of signals in the case where the expressions "time lag dt1>time lag dt2" and "time difference tx>time difference ty" both hold.

In this case, the time Tn for the second round of the belt rotation advances with respect to the time Tf for the first round, as shown in the drawing. Although the first line for the second rotation is shifted by one quarter of the dot width backward from that for the first rotation, this magnitude of image mismatch is within the tolerance limit.

FIG. 9 includes a timing chart illustrating the sequence of signals in the case where the expressions "time lag dt1>time lag dt2" and "time difference tx<time difference ty" both hold.

In this case, the time Tf for the first round of the belt rotation advances with respect to the time Tn for the second round as shown in the drawing and the first line for the second rotation is shifted by one quarter of the dot width backward from that for the first rotation.

It is indicated from the comparison between FIGS. 8 and 9, in order to contain the magnitude of color mismatch within the tolerance limit of one quarter of the dot width in the case of "time lag dt1>time lag dt2", it is necessary to set forward the time for initiating optical image writing for the second round is adjusted to be delayed with respect to that for the first round.

Also indicated from FIG. 9 is that, in the case of "time difference tx<time difference ty", the color mismatch can be contained within one quarter of the dot width, when the time for initiating optical image writing for the second round is advanced by one period T from the time Tn.

Based on the above noted findings, the printer disclosed herein is configured to implement several controls which follow.

That is, the time difference tx, as the difference between the times Te and Tf is measured by the time lag measurement means 66 during the first round of the belt rotation, and the result from this measurement is stored in the data memory means 65.

Also, based on the result from the measurement of second time lag dt2 during the second round of the belt rotation, and the relationship between this result and the base correction time t1, the time difference ty is computed as the difference between the times Tm and Tn.

Since the base correction time t1 and main scanning period T are herein assumed as constant, the time difference ty can be calculated from the result of the second time lag dt2.

In the case where it is determined, base on the result of comparison of the time difference Δt with standard time difference ts, that the phase correction steps are not carried out in the main scanning direction, optical image writing steps are initiated at the moment during the second round when a first beam detection signal is detected for the first time after the elapse of a predetermined time from Tc.

Regarding the noted predetermined time, whether its length is set to be equal to, or smaller or larger than, the base correction time t1 is determined as follows based on the time lags dt1 and dt2, and time differences tx and ty.

To be specific, in the case of either "dt1<dt2" and "tx<ty", or "dt1>dt2" and "tx>ty", optical image writing steps are initiated at the moment, during the second round, when a first beam detection signal is detected for the first time after the time Tm (FIGS. 6 and 8).

In contrast, in the case of "dt1<dt2" and "tx>ty", the predetermined time is determined to be "(base correction time t1)+(main scanning period T)", in which Tn is shifted backward by one cycle, as shown in FIG. 7.

In addition, in the case of "dt1>dt2" and "tx<ty", the predetermined time is determined to be "(base correction time t1)−(main scanning period T)", in which Tn shifted forward by one cycle, as shown in FIG. 9.

By means of the setting described above, the magnitude of image mismatch can be ensured to be contained within the tolerance limit in the case where it is decided that the phase correction steps are not carried out in the main scanning direction.

Namely, again in the case where it is decided that the phase correction steps are not carried out in the main scanning direction, the image mismatch can certainly be contained within the tolerance limit by suitably determining the above noted times, or time parameters, based on the time lags dt1 and dt2, and time differences tx and ty.

EXAMPLE 2

In the method for determining several time parameters based on time points Tf and Te, the time lags dt1 and dt2, and time differences tx and ty, which is utilized in the printer described in Example 1, the method is adopted in which the time parameters such as the time points Tf and Te, and time differences tx and ty, are firstly measured.

In contrast, the printer mentioned in Example 2 is adapted to utilize another method for determining the noted time parameters, even though the determination of the time points Tf and Te, and time differences tx and ty, are still involved, which will be descried herein below.

Previously illustrated is the case where the expression "time lag dt1<time lag dt2" holds in reference to FIGS. 6 and 7.

Furthermore, since "time lag dt1<time lag dt2" in FIG. 6, it is shown that the time Tn for the second round is positioned further back from the time Tc elapsed by "(base correction time t1)+(time difference tx)".

As a result, if "(base correction time t1)+(time difference tx)" is presently defined as an added correction time, t1', proper timing is achieved also at time Tn, when a first beam detection signal is detected for the first time after the time Tc plus the added correction time t1' during the second round of the belt rotation.

In contrast, in the case of "time difference tx>time difference ty" as shown in FIG. 7, the time for initiating optical image writing for the second round is preferably delayed by one period T from the time Tn, as described earlier.

Since "time difference tx>time difference ty" in this case, it is shown that the time is bound to elapse beyond Tn, when time passes from Tc by the length of the added correction time t1', or t1 plus tx.

As a result, the timing, at which a first beam detection signal is detected for the first time after the time Tc plus the added correction time t1' (or, t1+tx) during the second round, is achieved being delayed by one period T from the time Tn.

Accordingly, in the case where "time lag dt1<time lag dt2", it is preferable for the optical image writing be initiated at the timing at which a first beam detection signal is detected for the first time after Tc plus the added correction time t1' (t1+tx) during the second round.

Previously illustrated is the case where the expression "time lag dt1>time lag dt2" holds in reference to FIGS. 8 and 9.

In both cases, if "(base correction time t1)+(time difference tx)" is again defined as an added correction time, t1', it is indicated the timing for a first beam detection signal is brought to be synchronized with the timing which is earlier by the time difference Δt from the time Tc plus the added correction time t1' (or, t1+tx) during the second round of the belt rotation.

Also indicated is that, when optical image writing for the second round is initiated at the above noted timing, the image mismatch can be contained within the tolerance limit.

Accordingly, in the case where "time lag dt1>time lag dt2", it is preferable for the optical image writing during the second round of belt rotation be initiated at the timing which is earlier by the time difference Δt from the time Tc plus the added correction time t1' (or, t1+tx).

Based on the above noted findings, the present printer is configured to determine the timing of optical image writing during the second round of belt rotation as follows.

That is, the added correction time t1' (or, t1+tx) is firstly measured during the first round of the belt rotation, and then a time-keeping step is initiated at Tc for the second round.

Subsequently, as soon as the time difference Δt based on time lag dt2 is obtained, "(added correction time t1')−(time difference Δt)" is computed, which is successively compared with time currently counted. Thereafter, just prior to the moment when the time currently counted reach the computed result of "t1'·Δt" (the computed result—T/10, for example), the time-keeping is terminated.

Therefore, in the case where it is decided that the phase correction is not carried out in the main scanning direction, in a similar manner to Example 1, the image mismatch can be contained within the tolerance limit by suitably determining the timing for initiating the optical image writing as described above.

Namely, again in the case where it is decided that the phase correction steps are not carried out in the main scanning direction, the image mismatch can be contained within the tolerance limit by suitably determining the above noted times, or time parameters, based on the time lags dt1 and dt2, and added correction time t1'.

EXAMPLE 3

The printer disclosed in Example 3 is provided with a plurality of base marks equally spaced with a predetermined pitch there between each affixed onto one of the circumferential edges of the intermediate transfer belt 31 in the direction of its endless rotation.

The noted predetermined pitch is taken as "(distance between process units L1)−(distance L2)", where L2 is the distance covered by the displacement of the intermediate transfer belt 31 over the base correction time t1.

Owning to such structure and to relatively small size of toner images formed, it is well assumed that optical image writing onto 1YC photoreceptor for Y and C images, which is previously initiated based on a mark detection signal, is completed by the time a next mark detection signal is detected.

Under such conditions, it is also assumed that Y or C toner images on the 1YC photoreceptor for Y and C images are not disturbed, even if the phase of the main direction scanning is shifted by controlling the drive of polygonal motor 23b at the time the mark detection signal is detected.

In addition, when correction steps for shifting the phase of the main direction scanning by one cycle is initiated at the time the mark detection signal is detected, the noted control can be completed by the time when the moment arrives for the succeeding optical image writing onto 1MK photoreceptor for M and K images have to be initiated.

Therefore, even in the case where a relatively large change arises in speed of the intermediate transfer belt caused by belt slippage, for example, the disagreement in image superposition caused by the slippage can be suppressed without disturbing the Y and C toner images by initiating the correction of the phase in the main direction scanning at the time the slippage arises.

Accordingly, the printer disclosed herein is configured to be capable of obviating the disagreement in image superposition even in the case where a relatively large change arises in speed of the intermediate transfer belt caused by belt slippage between the neighboring photoreceptors.

To be specific, if optical image writing onto 1YC photoreceptor for Y and C images is completed at time Tg, which is one rotation cycle after the time Ta for the first rotation of the belt, as illustrated in FIG. 10, time-keeping steps are carried out for measuring a time lag dt3 between Tg and the time when a second beam detection signal is detected for the first time after Tg.

In the case where no major belt velocity change caused by belt slippage is caused during Ta and the time mentioned just above, the time lags dt3 and dt1 are equal to each other. In contrast, there gives rise to a difference between the two, when the belt slippage has been caused.

When this difference exceeds a predetermined threshold, the drive control of polygonal motor 23a is carried out to adjust the phase in the main scanning direction and to be brought into coincidence with the phase prior to the belt slippage.

Thus, the timing for initiating optical image writing onto 1YC photoreceptor for Y and C images during the first round of belt rotation is synchronized with that onto 1MK photoreceptor for Y and C images, in relative manner as shown in FIG. 10, that is, each resulting the same timing at (base correction time t1) plus (time difference tx).

For the second round of the rotation, steps for correcting the phase of the main direction scanning to coincide with that during the first round of belt rotation are carried out prior to optical image writing onto 1YC photoreceptor for Y and C images.

In addition, when optical image writing onto 1YC photoreceptor for Y and C images is completed at time Th when a succeeding beam detection signal is detected for the first time after Tc, time-keeping steps are carried out for measuring a time lag dt4 between Th and the time when a second beam detection signal is detected for the first time after Th.

Thereafter, when the difference between the time lags dt2 and dt4 exceeds a predetermined threshold, the drive control of polygonal motor 23a is carried out to adjust the phase in the main scanning direction and to be brought into coincidence with the phase prior to the belt slippage.

As a result, the timing of initiating image writing for all of the first, second, third, and fourth colors, is brought to be synchronized with each other at the timing of (base correction time t1) plus (time difference tx) in relative manner as shown in the drawing.

EXAMPLE 4

The printer disclosed in Example 4 is also configured to be capable of obviating the disagreement in image superposition even in the case where a relatively large change arises in speed of the intermediate transfer belt caused by belt slippage between the neighboring photoreceptors.

In place of the plurality of base marks in the previous printer, however, only one base mark are affixed to the intermediate transfer belt and two mark detection means are provided. One of the mark detection units is placed at the same location as the first mark detection means of FIG. 1, and the second mark detection means is placed between 1YC photoreceptor for Y and C images and 1MK photoreceptor for M and K images.

In addition, the distance between these mark detection means is adjusted to be the "(distance between process units L1)−(distance L2)".

Therefore, the time difference between the timings of mark detection by the mark detection means comes to be equal to that between a first base mark and next succeeding base mark, described earlier on the printer of Example 3.

In this structure, there defined are the time Ti as the timing when a mark detection signal is detected after Ta, as a second mark detection signal, by the second mark detection means; the time lag dt5 as the time when a second mark detection signal is detected for the first time after Ti; the time Tj as the timing when a second mark detection signal is detected after Tc by the second mark detection means; and the time lag dt6 as the time when a second mark detection signal is detected for the first time after Tc.

By utilizing the noted time parameters, the parameters of FIG. 10 such as the times Tg and Th, and time lags dt3 and dt4 are now replaced with the above noted parameters such as the times Ti and Tj, and time lags dt5 and dt6, respectively, whereby the disagreement in image superposition can be suppressed even in the case where a relatively large change in speed of the intermediate transfer belt is caused.

EXAMPLE 5

The printer disclosed in Example 5 is configured to suitably be operated according to specific image information, in that the images to be formed are of double-color, and are able to be formed by superposing Y or C images which can be formed by the first process unit 10YC, and M or K images which can be formed by the second process unit 10MK.

In such a case, the printer can operate to form resultant double-color images without rotating twice the intermediate transfer belt 31.

However, this printer is configured to leave the development means enabled (or on standby) such as 3Y for Y images and 3M for M images included in first and second process units 10YC and 10MK, respectively.

In the printer operation as it is, a second rotation of the belt 31 is needed when the second color of the double-color is of either M or K.

Therefore, an improvement can be provided in such a case as above with the second color of either M or K, such that appropriate development means 3M or 3K included in the process unit 10YC or 10MK, respectively, are enabled by the aforementioned development shifting means in place of the development means 3Y or 3M included in the process unit 10YC or 10MK.

With this improved structure, a prolonged image formation period can be alleviated, which is otherwise caused by the previous structure enabling the development means always in a preset color sequence and often necessitating the second rotation to form the images of arbitrarily selected double colors, as mentioned earlier.

The apparatuses and process steps set forth in the present description may therefore be implemented using suitable host computers and terminals incorporating appropriate processors programmed according to the teachings disclosed herein, as will be appreciated to those skilled in the relevant arts.

Therefore, the present disclosure also includes a computer-based product which may be hosted on a storage medium and include instructions which can be used to program a processor to perform a process in accordance with the present disclosure. The storage medium can include, but is not limited to, any type of disk including floppy disks, optical disks, CD-ROMS, magneto-optical disks, ROMs, RAMs, EPROMs, EEPROMS, flash memory, magnetic or optical cards, or any type of media suitable for storing electronic instructions.

It is apparent from the above description including example, the printer disclosed herein has several advantages over similar apparatuses previously known.

For example, the first and second process units included in the printer constitute a pair neighboring with each other, each comprising two visible image forming means which are each in the relationship neighboring with each other.

In this printer, after forming a double-color image by sequentially transferring to superpose Y and M toner images each formed by the first and second process units onto the surface of intermediate transfer belt during a first round of rotation of the transfer belt, a quadruple-color image is formed by sequentially transferring to superpose C and K toner images each formed by the first and second process units onto the double-color image during the second round of rotation of intermediate transfer belt.

In addition, the light scanning means 20 is configured, after storing the time lag dt1 during a first rotation of intermediate transfer belt, to measure the time lag dt2 during the second rotation of intermediate transfer belt, and to correct the phase based on time lag dt2 and time lag dt1 previously stored.

As a result of the noted construction of the printer, by correcting the phase of rotation in the main direction scanning during each round of the rotation based on time lags dt1 and dt2, the disagreement in images through quadruple superposition can be obviated.

In addition, the light scanning means 20 included in the apparatus is configured to initiate optical image writing for a first round of rotation of intermediate transfer belt onto the photoreceptor 1YC for Y and C images based on the first mark detection signal detected firstly after the time Te.

Furthermore, by correcting the phase, during the period between time Tc and the time Tc elapsed by base correction time t1, based on time lag dt2 and time lag dt1, the light scanning means is adapted to initiate optical image writing for a second round of rotation of intermediate transfer belt onto the photoreceptor 1YC for Y and C images.

As a result, by initiating optical image writing after the time elapsed by t1 for each round of rotation, the correction of the phase in the main direction scanning is secured for the second round of rotation prior to initiating optical image writing onto the photoreceptor 1YC for Y and C images.

Although characteristic features and advantages of the present printer have been described earlier, they are summarized as follows.

The printer disclosed herein is adapted not to carry out the phase correction steps in the case of "standard time difference ts≧time difference Δt". With this construction the mismatch in image superposition in the vertical scanning direction can be contained within a tolerance limit, and the deterioration of the polygonal motor unit is prevented which is otherwise caused by the application of step pulses for shifting the rotational phase of the motor based on correction signals.

In addition, the printer is adapted, in the case where it is decided that the correction of the phase is not implemented, to initiate optical image writing for a second round of belt rotation based on the time when the standard angle detection signal is detected firstly after a time elapsed by a predetermined time from Tc, and to determine the predetermined time in comparison with the base correction time t1 based on at least the times Tf and Te, base correction time t1, time lags dt1 and dt2.

With this construction the image mismatch can be contained within the tolerance limit.

To be specific, the printer is adapted to determine the predetermined time based on the time difference tx between the time Te and the time Tf, and magnitude relation of the time lags dt1 and dt2. Proper timing for initiating optical image writing for a second round of belt rotation can therefore be determined.

Alternatively, the printer is adapted to determine the predetermined time based on at least magnitude relation of the time lags dt1 and lag dt2, and the added correction time t1' (or t1+tx). Proper timing for initiating optical image writing for a second round of belt rotation can therefore be determined.

Still in addition, the printer is further provided with plural base marks equally spaced with a predetermined pitch there between each affixed onto the intermediate transfer belt member in the direction of endless rotation.

In the case where optical image writing onto 1YC photoreceptor for a first round of belt rotation is completed at the time Tg when a predetermined number of the mark detection signals are detected after the time Ta, this printer is adapted to correct the phase, during the period between the time Tg and the time after time Tg elapsed by the base correction time t1, based on the time lag dt3 and the time lag dt1, and to initiate optical image writing onto 1MK photoreceptor for the first round of belt rotation.

As a result, the disagreement in image superposition caused by the slippage can be suppressed even in the case where a relatively large change arises in speed of the intermediate transfer belt caused by belt slippage between the pair of the neighboring photoreceptor during the first round of belt rotation.

Alternatively, in the case where optical image writing onto 1YC photoreceptor for a second round of belt rotation is completed at the time Th, this printer is adapted to correct the phase, during the period between the time Th and the time after time Th elapsed by the base correction time t1, based on the time lag dt4 and the time lag dt1, and to initiate optical image writing onto 1MK photoreceptor for the second round of belt rotation.

As a result, the disagreement in image superposition caused by the slippage can be suppressed even in the case where a relatively large change arises in speed of the intermediate transfer belt caused by belt slippage between the pair of the neighboring photoreceptor during the second round of belt rotation.

In addition, the printer is further provided with a first mark detection means as the mark detection means and a second mark detection means.

In the case where optical image writing onto 1YC photoreceptor for a first round of belt rotation is already completed at the time Ti when a mark detection signal is detected by the second mark detection means after the time Ta when a previous mark detection signal is detected by the first mark detection means, the light scanning means is adapted to correct the phase, during the period between the time Ti and the time after time Ti elapsed by the base correction time t1, based on the time lag dt5 and the time lag dt1, and to initiate optical image writing onto 1MK photoreceptor for the first round of belt rotation.

As a result, the disagreement in image superposition. caused by the slippage can be suppressed even in the case where a relatively large change arises in speed of the intermediate transfer belt caused by belt slippage between the pair of the neighboring photoreceptor during the first round of belt rotation.

Alternatively, in the case where optical image writing onto 1YC photoreceptor for a first round of belt rotation is already completed at the time Ti when a mark detection signal is detected by the second mark detection means after the time Tc when a previous mark detection signal is detected by the first mark detection means, the light scanning means is adapted to correct the phase, during the period between the time Tj and the time after time Tj elapsed by the base correction time t1, based on the time lag dt6 and the time lag dt2, and to initiate optical image writing onto 1MK photoreceptor for the second round of belt rotation.

As a result, the disagreement in image superposition caused by the slippage can be suppressed even in the case where a relatively large change arises in speed of the intermediate transfer belt caused by belt slippage between the pair of the neighboring photoreceptor during the second round of belt rotation.

In addition, the printer is adapted in the case where the image information is of double-color images which can be formed by superposing first color images formed by the first process unit 10YC and second color images formed by the second process unit 10MK, to initiate optical image writing onto 1YC photoreceptor.

In such a case, the printer can operate to form resultant double-color images without rotating twice the intermediate transfer belt.

Alternatively, in the case where the double-color images can be formed of the first color which can be developed anyone of the plurality of development means included in the first process unit 10YC and of the second color which can be developed anyone of the plurality of development means included in the second process unit 10MK, the first and second process units are each adapted to enable the first color and the second color, respectively, by selectively enabling one of the plurality of development means included in each of the first and second process units by means of the development effecting means.

Thus, there obviated with the present apparatus are the shear of superposed images in the vertical scanning direction, prolonged image forming periods resulted from a large number of rotation of intermediate transfer member, and undue complication in the structure of light beam scanning means caused by incorporating plural light deflecting means for exclusive use for each visible image forming units.

Obviously, additional modifications and variations of the present invention are possible in light of the above teachings. It is therefore to be understood that within the scope of the appended claims, the invention may be practiced otherwise than as specifically described herein.

This document claims priority and contains subject matter related to Japanese Patent Application No. 2003-78943, filed with the Japanese Patent Office on Mar. 20, 2003, the entire contents of which are hereby incorporated by reference.

What is claimed is:

1. An image forming apparatus, comprising:
a plurality of latent image bearing members;
a plurality of visible image forming units each including development means for developing latent images on said corresponding latent image bearing member to form visible images thereon;
a light scanning means for forming said latent images on said latent image bearing members, said scanning means including a deflecting means for deflecting image information light to form said latent images on surfaces of said latent image bearing members;
an endless intermediate transfer member;
means for rotating said endless intermediate transfer member;
a transfer means for transferring said visible images formed by said visible image forming units in a manner to be superposed on said endless intermediate transfer member;
a mark detection means for detecting a base mark affixed onto a predetermined location on a surface of said endless intermediate transfer member and providing a mark detection signal corresponding thereto;
a standard angle detection means for detecting the light deflected by said deflecting means arriving at a predetermined angle of deflection; and
a deflection angle phase correction means included in said light scanning means for correcting a phase of change in angle of deflection caused by said deflecting means based on at least the mark detection signal from said mark detection means and a standard angle detection signal from said standard angle detection means,
wherein said light scanning means is configured to carry out light scanning onto said plurality of latent image bearing members such that at least one pair of neighboring visible image forming units of said plurality of visible image forming units are both subjected to the light scanning by a same deflecting means,
wherein said endless intermediate transfer member is adapted to be rotated for a plurality of rounds by said means for rotating such that the surface of the endless intermediate transfer member is superposed thereon with plural visible images each provided by a same of said visible image forming units for one of rounds of rotation of the endless intermediate transfer member;
wherein said plurality of visible image forming units each further includes first and second visible image forming units to constitute said pair of neighboring visible image forming units, such that, after forming a double-color image by sequentially transferring to superpose said plural visible images each formed by said first and second visible image forming units onto the surface of said endless intermediate transfer member during a first round of rotation of said endless intermediate transfer member, a quadruple-color image is formed by sequentially transferring to superpose plural visible images each formed by said first and second visible image forming units onto said double-color image during a second round of rotation of said endless intermediate transfer member;
wherein said light scanning means is further configured, after storing a time lag dt1 as a difference between a time Ta when the mark detection signal is detected and a time Tb when said standard angle detection signal is detected during the first round of rotation of said endless intermediate transfer member, to measure a time lag dt2 as a difference between a time Tc when said mark detection signal is detected and a time Td when said standard angle detection signal is detected during a second rotation of said endless intermediate transfer member, and to correct said base based on said time lag dt2 and said time lag dt1 previously stored; and
wherein said light scanning means is further configured to store in advance a predetermined base correction time; initiate optical image writing for the first round of rotation of said endless intermediate transfer member onto said latent image bearing member included in said first visible image forming unit based on said standard angle detection signal detected after a time Te determined as a time elapsed by a base correction time t1 from said time Ta; correct said phase, during a period between the time Tc and a time including the time Tc and said base correction time t1, based on said time lag dt2 and said time lag dt1; and initiate optical image writing for the second round of rotation of said endless intermediate transfer member onto said latent image bearing member included in said first visible image forming unit.

2. The image forming apparatus according to claim 1, wherein said light scanning means is further configured to store in advance a predetermined standard time difference ts; to compute a time difference at Δt as a difference between said time lag dt2 and said time lag dt1; and, in a case where said standard time difference ts ≧ said time difference Δt, it is decided not to correct said phase prior to said optical image writing for the first round of rotation of said endless intermediate transfer member onto said latent image bearing member included in said first visible image forming unit.

3. The image forming apparatus according to claim 2, wherein, in said case where it is decided not to correct said phase, said light scanning means is further configured to initiate optical image writing for the second round of rotation of said endless intermediate transfer member onto said latent image bearing member included in said first visible image forming unit based on a time when said standard angle detection signal is detected firstly after a time has elapsed by a predetermined time from the time Tc, and determine said predetermined time based in at least a time Tf when optical image writing is initiated for the first round of rotation of said endless intermediate transfer member onto said latent image bearing member included in said first visible image forming unit, said time Te, said base correction time t1, said time lag dt1, and said time lag dt2.

4. The image forming apparatus according to claim 3, wherein, in said case where it is decided not to correct said phase, said light scanning means is further configured to store in advance a time difference tx between said time Te and said time Tf, and determine said predetermined time based on at least magnitude relation of said time lag dt1 and said time lag dt2, and said time difference tx.

5. The image forming apparatus according to claim 4, further comprising:
a plurality of base marks equally spaced with a predetermined pitch there between each affixed onto said endless intermediate transfer member in a direction of rotation,
wherein, in a case where optical image writing for the first round of rotation of said endless intermediate transfer member onto said latent image bearing member included in said first visible image forming unit is completed at a time Tg when a predetermined number of mark detection signals are detected after said time Ta, said light scanning means is further configured to correct said phase, during a period between said time Tg and a time after said time Tg that has elapsed by said base correction time t1, based on a time lag dt3 between said time Tg and a time when said standard angle detection signal is detected firstly after said time Tg, and said time lag dt1; and initiate optical image writing for said first round of rotation of said endless intermediate transfer member onto said latent image bearing member included in said second visible image forming unit.

6. The image forming apparatus according to claim 5, wherein, in a case where optical image writing for the second round of rotation of said endless intermediate transfer member onto said latent image bearing member included in said first visible image forming unit is already completed at a time Th when anyone of said mark detection signals is detected after said time Tc, said light scanning means is further configured to correct said phase, during a period between said time Th and a time after said time Th that has elapsed by said base correction time t1, based on a time lag dt4 between said time Th and a time when said standard angle detection signal is detected firstly after said time Th, and said time lag dt2; and initiate optical image writing for said second round of rotation of said endless intermediate transfer member onto said latent image bearing member included in said second visible image forming unit.

7. The image forming apparatus according to claim 4, further comprising:
a first mark detection means as said mark detection means; and
a second mark detection means for detecting a second base mark situated between said first and said second visible image forming units,
wherein, in a case where optical image writing for the first round of rotation of said endless intermediate transfer member onto said latent image bearing member included in said first visible image forming unit is already completed at a time Ti when a second mark detection signal is produced by said second mark detection means after said time Ta when the mark detection signal is produced by said first mark detection means as a previous mark detecting signal, said light scanning means is further configured to correct said phase, during a period between said time Ti and a time after said time Ti that has elapsed by said base correction time t1, based on a time lag dt5 between said time Ti and a time when said standard angle detection signal is produced firstly after said time Ti, and said time lag dt1; and initiate optical image writing for said first round of rotation of said endless intermediate transfer member onto said latent image bearing member included in said second visible image forming unit.

8. The image forming apparatus according to claim 7, wherein, in a case where optical image writing for the second round of rotation of said endless intermediate transfer member onto said latent image bearing member included in said first visible image forming unit is already completed at a time Tj when the second mark detection signal is produced by said second mark detection means after said time Tc when the mark detection signal is produced by said first mark detection means as a previous mark detecting signal, said light scanning means is further configured to correct said phase, during a period between said time Tj and a time after said time Tj has elapsed by said base correction time t1, based on a time lag dt6 between said time Tj and a time when said standard angle detection signal is detected firstly after said time Tj, and said time lag dt2; and initiate optical image writing for said second round of rotation of said endless intermediate transfer member onto said latent image bearing member included in said second visible image forming unit.

9. The image forming apparatus according to claim 4, wherein, in a case where image information is of double-color images, said double-color images being able to be formed by superposing first color images formed by said first visible image forming unit and second color images formed by said second visible image forming unit, said light scanning means is further configured to initiate optical image writing onto said latent image bearing member included in said first visible image forming unit based on a time when said standard angle detection signal is detected firstly after said time Ta without waiting for an arrival of said time Te.

10. The image forming apparatus according to claim 9, wherein each of said first and second visible image forming units includes a plurality of the development means; and a development effecting means for selectively enabling one of said first and second visible image forming units, wherein, in a case where said double-color images can be formed of a first color being able to be developed by anyone of said plurality of development means included in said first visible image forming unit and of a second color being able to be developed by anyone of said plurality of development means included in said second visible image forming unit, said first and second visible image forming units are each configured to enable said first color and said second color, respectively, by selectively enabling one of said plurality of development means by means of said development effecting means.

11. The image forming apparatus according to claim 4, wherein, in said case where it is decided not to correct said phase, said light scanning means is further configured to store a sum of said time difference tx and said base correction time t1 as an added correction time t1', and determine said predetermined time based on at least magnitude, relation of said time lag dt1 and said time lag dt2, and said added correction time t1'.

12. The image forming apparatus according to claim 11, further comprising:
a plurality of base marks equally spaced with a predetermined pitch there between each affixed onto said endless intermediate transfer member in a direction of rotation,
wherein, in a case where optical image writing for the first round of rotation of said endless intermediate transfer member onto said latent image bearing member included in said first visible image forming unit is completed at a time Tg when a predetermined number of mark detection signals are detected after said time Ta, said light scanning means is further configured to correct said phase, during a period between said time Tg and a time after said time Tg that has elapsed by said base correction time t1, based on a time lag dt3 between said time Tg and a time when said standard angle detection signal is detected firstly after said time Tg, and said time lag dt1; and initiate optical image writing for said first round of rotation of said endless intermediate transfer member onto said latent image bearing member included in said second visible image forming unit.

13. The image forming apparatus according to claim 12, wherein, in a case where optical image writing for the second round of rotation of said endless intermediate transfer member onto said latent image bearing member included in said first visible image forming unit is already completed at a time Th when anyone of said mark detection signals is detected after said time Tc, said light scanning means is further configured to correct said phase, during a period between said time Th and a time after said time Th that has elapsed by said base correction time t1, based on a time lag dt4 between said time Th and a time when said standard angle detection signal is detected firstly after said time Th, and said time lag dt2; and initiate optical image writing for said second round of rotation of said endless intermediate transfer member onto said latent image bearing member included in said second visible image forming unit.

14. The image forming apparatus according to claim 11, further comprising:

a first mark detection means as said mark detection means; and a second mark detection means for detecting a second base mark situated between said first and said second visible image forming units, wherein, in a case where optical image writing for the first round of rotation of said endless intermediate transfer member onto said latent image bearing member included in said first visible image forming unit is already completed at a time Ti when a second mark detection signal is produced by said second mark detection means after said time Ta when the mark detection signal is produced by said first mark detection means as a previous mark detecting signal, said light scanning means is further configured to correct said phase, during a period between said time Ti and a time after said time Ti that has elapsed by said base correction time t1, based on a time lag dt5 between said time Ti and a time when said standard angle detection signal is detected firstly after said time Ti, and said time lag dt1; and initiate optical image writing for said first round of rotation of said endless intermediate transfer member onto said latent image bearing member included in said second visible image forming unit.

15. The image forming apparatus according to claim 14, wherein, in a case where optical image writing for the second round of rotation of said endless intermediate transfer member onto said latent image bearing member included in said first visible image forming unit is already completed at a time Tj when the second mark detection signal is produced by said second mark detection means after said time Tc when the mark detection signal is detected by said first mark detection means as a previous mark detecting signal, said light scanning means is further configured to correct said phase, during a period between said time Tj and a time after said time Tj elapsed by said base correction time t1, based on a time lag dt6 between said time Tj and a time when said standard angle detection signal is detected firstly after said time Tj, and said time lag dt2; and initiate optical image writing for said second round of rotation of said endless intermediate transfer member onto said latent image bearing member included in said second visible image forming unit.

16. The image forming apparatus according to claim 11, wherein, in a case where image information is of double-color images, said double-color images being able to be formed by superposing first color images formed by said first visible image forming unit and second color images formed by said second visible image forming unit, said light scanning means is further configured to initiate optical image writing onto said latent image bearing member included in said first visible image forming unit based on a time when said standard angle detection signal is detected firstly after said time Ta without waiting for an arrival of said time Te.

17. The image forming apparatus according to claim 16, wherein each of said first and second visible image forming units includes a plurality of development means; and a development effecting means for selectively enabling one of said first and second visible image forming units, wherein, in a case where said double-color images can be formed of a first color being able to be developed by anyone of said plurality of development means included in said first visible image forming unit and of a second color being able to be developed by anyone of said plurality of development means included in said second visible image forming unit, said first and second visible image forming units are each configured to enable said first color and said second color, respectively, by selectively enabling one of said plurality of development means by means of said development effecting means.

18. An image forming apparatus, comprising:

means for bearing latent images;

means for forming visible images by developing said latent images;

means for implementing light scanning to form said latent images by deflecting light, including image information, to irradiate surfaces of said means for bearing latent images;

means for transferring visible images formed by said means for forming visible images including an intermediate transfer means rotated by a rotation means;

first means for detecting a base mark affixed onto a predetermined location on a surface of said intermediate transfer means;

second means for detecting light deflected by said means for implementing light scanning at a predetermined angle of deflection; and means for correcting a phase of change in angle of deflection by said means for implementing light scanning based on at least a mark detection signal from said first means for detecting a base mark, and a standard angle detection signal from said second means for detecting light, wherein said means for implementing light scanning carries out light scanning such that at least one pair of neighboring visible image forming means of said means for forming visible images are subjected to light scanning both by a same of said means for implementing light scanning, wherein said intermediate transfer means is adapted to be rotated for a plurality of rounds such that the surface thereof is superposed thereon with plural visible images each provided by a same of said means for forming visible images during each round;

wherein said means for forming visible images further includes first and second image forming means to constitute said pair of neighboring visible image forming means, such that, after forming a double-color image by sequentially transferring to superpose said plural visible images each formed by said first and second visible image forming means onto the surface of said intermediate transfer means during a first round of rotation of said intermediate transfer means, a quadruple-color image is formed by sequentially transferring to superpose plural visible images each formed by said first and second visible image forming means onto said double-color image during a second round of rotation of said intermediate transfer means;

wherein said means for implementing light scanning is further configured, after storing a time lag dt1 as a difference between a time Ta when the mark detection signal is detected and a time Tb when said standard angle detection signal is detected during the first round of rotation of said intermediate transfer means, to measure a time lag dt2 as a difference between a time Tc when said mark detection signal is detected and a time Td when said standard angle detection signal is detected during the second rotation of said intermediate transfer means, and to correct said phase based on said time lag dt2 and said time lag dt1 previously stored; and wherein said means for implementing light scanning is further configured to store in advance a predetermined base correction time: initiate optical image writing for the first round of rotation of said intermediate transfer means onto said latent image bearing means included in said first visible image forming means based on said standard angle detection signal detected after a time Te determined as a time elapsed by a base correction time t1 from said time Ta; correct said phase, during a period between the time Tc and a time including the time Tc and said base correction time t1, based on said time lag dt2 and said time lag dt1; and initiate optical image writing for the second round of rotation of said intermediate transfer means onto said means for bearing latent images included in said first visible image forming means.

19. The image forming apparatus according to claim 18, wherein said means for implementing light scanning is further configured to store in advance a predetermined standard time difference ts; to compute a time difference Δt as a difference between said time lag dt2 and said time lag dt1; and, in a case where said standard time difference ts ≧ said time difference Δt, it is decided not to correct said phase prior to said optical image writing for the first round of rotation of said intermediate transfer means onto said means for bearing latent images included in said first visible image forming means.

20. The image forming apparatus according to claim 19, wherein, in said case where it is decided not to correct said phase, said means for implementing light scanning is further configured to initiate optical image writing for the second round of rotation of said intermediate transfer means onto said means for bearing latent images included in said first visible image forming means based on a time when said standard angle detection signal is detected firstly after a time has elapsed by a predetermined time from the time Tc, and determine said predetermined time based in at least a time Tf when optical image writing is initiated for the first round of rotation of said intermediate transfer means onto said means for bearing latent images included in said first visible image forming means, said time Te, said base correction time t1, said time lag dt1, and said time lag dt2.

21. The image forming apparatus according to claim 20, wherein, in said case where it is decided not to correct said phase, said means for implementing light scanning is further configured to store in advance a time difference tx between said time Te and said time Tf, and determine said predetermined time based on at least magnitude relation of said time lag dt1 and said time lag dt2, and said time difference tx.

22. The image forming apparatus according to claim 21, further comprising:
a plurality of base marks equally spaced with a predetermined pitch there between each affixed onto the intermediate transfer means in a direction of rotation,
wherein, in a case where optical image writing for the first round of rotation of said intermediate transfer means onto said means for bearing latent images included in said first visible image forming means is completed at a time Tg when a predetermined number of mark detection signals are detected after said time Ta, said means for implementing light scanning is further configured to correct said phase, during a period between said time Tg and a time after said time Tg that has elapsed by said base correction time t1, based on a time lag dt3 between said time Tg and a time when said standard angle detection signal is detected firstly after said time Tg, and said time lag dt1; and initiate optical image writing for said first round of rotation of said intermediate transfer means onto said means for bearing latent images included in said second visible image forming means.

23. The image forming apparatus according to claim 22, wherein, in a case where optical image writing for the second round of rotation of said intermediate transfer means onto said means for bearing latent images included in said first visible image forming means is already completed at a time Th when anyone said mark detection signals is detected after said time Tc, said means for implementing light scanning is further configured to correct said phase, during a period between said time Th and a time after said time Th that has elapsed by said base correction time t1, based on a time lag dt4 between said time Th and a time when said standard angle detection signal is detected firstly after said time Th, and said time lag dt2; and initiate optical image writing for said second round of rotation of said intermediate transfer means onto said means for bearing latent images included in said second visible image forming means.

24. The image forming apparatus according to claim 21, further comprising:
first mark detection means as said first means for detecting a base mark; and
second mark detection means for detecting a second base mark situated between said first said second visible image forming means,
wherein, in a case where optical image writing for the first round of rotation of said intermediate transfer means onto said means for bearing latent images included in said first visible image forming means is already completed at a time Ti when a second mark detection signal is produced by said second mark detection means after said time Ta when the mark detection signal is produced by said first mark detection means as a previous mark detecting signal, said means for implementing light scanning is further configured to correct said phase, during a period between said time Ti and a time after said time Ti elapsed by said base correction time t1, based on a time lag dt5 between said time Ti that has and a time when said standard angle detection signal is detected firstly after said time Ti, and said time lag dt1; and initiate optical image writing for said first round of rotation of said intermediate transfer means onto said means for bearing latent images included in said second visible image forming means.

25. The image forming apparatus according to claim 24, wherein, in a case where optical image writing for the second round of rotation of said intermediate transfer means onto said means for bearing latent images included in said first visible image forming means is already completed at a time Tj when the second mark detection signal is produced by said second mark detection means after said time Tc when the mark detection signal is produced by said first mark detection means as a previous mark detection signal, said means for implementing light scanning is further configured to correct said phase, during a period between said time Tj and a time after said time Tj has elapsed by said base correction time t1, based on a time lag dt6 between said time Tj and a time when said standard angle detection signal is detected firstly after said time Tj, and said time lag dt2; and initiate optical image writing for said second round of rotation of said intermediate transfer means onto said means for bearing latent images included in said second visible image forming means.

26. The image forming apparatus according to claim 21, wherein, in a case where said image information is of double-color images, said double-color images being able to be formed by superposing first color images formed by said first visible image forming means and second color images formed by said second visible image forming means, said means for implementing light scanning is further configured to initiate optical image writing onto said means for bearing latent images included in said first visible image forming means based on a time when said standard angle detection signal is detected firstly after said time Ta without waiting for an arrival of said time Te.

27. The image forming apparatus according to claim 26, further comprising:
a plurality of development means included in each of said first and second visible image forming means; and
a development effecting means for selectively enabling one of said first and second visible image forming means,
wherein, in a case where said double-color images can be formed of a first color being able to be developed by anyone of said plurality of development means included in said first visible image forming means unit and of a second color being able to be developed by anyone of said plurality of development means included in said second visible image forming means, said first and second visible image forming means are each configured to enable said first color and said second color, respectively, by selectively enabling one of said plurality of development means by means of said development effecting means.

28. The image forming apparatus according to claim 21, wherein, in said case where it is decided not to correct said phase, said means for implementing light scanning light scanning means is further configured to store a sum of said time difference tx and said base correction time t1 as an added correction time t1', and determine said predetermined time based on at least magnitude relation of said time lag dt1 and said time lag dt2, and said added correction time t1'.

29. The image forming apparatus according to claim 28, further comprising:
a plurality of base marks equally spaced with a predetermined pitch there between each affixed onto said intermediate transfer means in a direction of endless rotation,
wherein, in a case where optical image writing for the first round of rotation of said intermediate transfer means onto said means for bearing latent images included in said first visible image forming means is completed at a time Tg when a predetermined number of mark detection signals are detected after said time Ta, said means for implementing light scanning is further configured to correct said phase, during a period between said time Tg and a time after said time Tg that has elapsed by said base correction time t1, based on a time lag dt3 between said time Tg and a time when said standard angle detection signal is detected firstly after said time Tg, and said time lag dt1; and initiate optical image writing for said first round of rotation of said intermediate transfer means onto said means for bearing latent images included in said second visible image forming means.

30. The image forming apparatus according to claim 29, wherein, in a case where optical image writing for the second round of rotation of said intermediate transfer means onto said means for bearing latent images included in said first visible image forming means is already completed at a time Th when anyone of said mark detection signals is detected after said time Tc, said means for implementing light scanning is further configured to correct said phase, during a period between said time Th and a time after said time Th that has elapsed by said base correction time t1, based on a time lag dt4 between said time Th and a time when said standard angle detection signal is detected firstly after said time Th, and said time lag dt2; and initiate optical image writing for said second round of rotation of said intermediate transfer means onto said means for bearing latent images included in said second visible image forming means.

31. The image forming apparatus according to claim 28, further comprising:
first mark detection means as said first means for detecting a base mark; and
second mark detection means for detecting a second base mark situated between said first and second visible image forming means,
wherein, in a case where optical image writing for the first round of rotation of said intermediate transfer means onto said means for bearing latent images included in said first visible image forming means is already completed at a time Ti when a second mark detection signal is produced by said second mark detection means after said time Ta when the mark detection signal is produced by said first mark detection means as a previous mark detecting signal, said means for implementing light scanning is further configured to correct said phase, during a period between said time Ti and a time after said time Ti that has elapsed by said base correction time t1, based on a time lag dt5 between said time Ti and a time when said standard angle detection signal is detected firstly after said time Ti, and said time lag dt 1; and initiate optical image writing for said first round of rotation of said intermediate transfer means onto said means for bearing latent images included in said second visible image forming means.

32. The image forming apparatus according to claim 31, wherein, in a case where optical image writing for the second round of rotation of said intermediate transfer means onto said means for bearing latent images included in said first visible image forming means is already completed at a time Tj when the second mark detection signal is detected by said second mark detection means after said time Tc when the mark detection signal is produced by said first mark detection means as a previous mark detecting signal, said means for implementing light scanning is further configured to correct said phase, during a period between said time Tj and a time after said time Tj elapsed by said base correction time t1, based on a time lag dt6 between said time Tj and a time when said standard angle detection signal is detected firstly after said time Tj, and said time lag dt2; and initiate optical image writing for said second round of rotation of said intermediate transfer means onto said means for bearing latent images included in said second visible image forming means.

33. The image forming apparatus according to claim 28, wherein, in a case where said image information is of double-color images, said double-color images being able to be formed by superposing first color images formed by said first visible image forming means and second color images formed by said second visible image forming means, said means for implementing light scanning is further configured to initiate optical image writing onto said means for bearing latent images included in said first visible image forming means based on a time when said standard angle detection signal is detected firstly after said time Ta without waiting for an arrival of said time Te.

34. The image forming apparatus according to claim 33, further comprising:

a plurality of development means included in each of said first and second visible image forming means; and a development effecting means for selectively enabling one of said first and second visible image forming means, wherein, in a case where said double-color images can be formed of a first color being able to be developed by anyone of said plurality of development means included in said first visible image forming means and of a second color being able to be developed by anyone of said plurality of development means included in said second visible image forming means, said first and second visible image forming means are each configured to enable said first color and said second color, respectively, by selectively enabling one of said plurality of development means by means of said development effecting means.

* * * * *